United States Patent
Lotti

(10) Patent No.: US 11,330,888 B1
(45) Date of Patent: May 17, 2022

(54) LIGHT-CURABLE ARTIFICIAL NAILS, METHODS OF PREPARATION AND METHODS OF USE THEREOF

(71) Applicant: Brilliance of Beauty, Inc., New York, NY (US)

(72) Inventor: Sahara Lotti, North Hollywood, CA (US)

(73) Assignee: Brilliance of Beauty, Inc., New York, NY (US)

( * ) Notice: Subject to any disclaimer, the term of this patent is extended or adjusted under 35 U.S.C. 154(b) by 0 days.

(21) Appl. No.: 17/519,453

(22) Filed: Nov. 4, 2021

Related U.S. Application Data

(60) Provisional application No. 63/110,218, filed on Nov. 5, 2020.

(51) Int. Cl.
| | |
|---|---|
| *C09J 11/06* | (2006.01) |
| *A45D 31/00* | (2006.01) |
| *C09J 11/04* | (2006.01) |
| *C09J 11/08* | (2006.01) |

(52) U.S. Cl.
CPC .............. *A45D 31/00* (2013.01); *C09J 11/04* (2013.01); *C09J 11/06* (2013.01); *C09J 11/08* (2013.01); *C09J 2301/416* (2020.08)

(58) Field of Classification Search
CPC .... A45D 31/00; A44C 15/00; A44C 15/0005; C09J 11/04; C09J 11/06; C09J 11/08; C09J 2301/416
See application file for complete search history.

(56) References Cited

U.S. PATENT DOCUMENTS

| | | | | |
|---|---|---|---|---|
| 3,676,283 | A | * | 7/1972 | Kehr et al. .............. B32B 27/00 442/149 |
| 4,626,428 | A | | 12/1986 | Weisberg et al. |
| 4,669,491 | A | | 6/1987 | Weisberg et al. |
| 4,704,303 | A | | 11/1987 | Cornell |
| 4,903,840 | A | * | 2/1990 | So ........................ A45D 29/001 206/581 |
| 5,269,330 | A | | 12/1993 | Hayes |
| 5,650,138 | A | | 7/1997 | Resler |
| 5,830,442 | A | | 11/1998 | Beaver |
| 5,985,951 | A | * | 11/1999 | Cook ..................... A61K 8/731 424/401 |

(Continued)

FOREIGN PATENT DOCUMENTS

| | | | |
|---|---|---|---|
| EP | 3135340 A1 | 3/2017 | |
| EP | 3165256 A1 | 5/2017 | |

(Continued)

OTHER PUBLICATIONS

International Search Report and Written Opinion dated Feb. 24, 2022, on application No. PCT/US2021/058076.

*Primary Examiner* — Sanza L. McClendon
(74) *Attorney, Agent, or Firm* — Lowenstein Sandler LLP

(57) ABSTRACT

A light-curable artificial nail is disclosed having an adhesive section including a light-curable composition in a semi-cured state. The light-curable composition is configured to transition from the semi-cured state to a cured state based on exposure to at least one wavelength of electromagnetic radiation. The light-curable artificial nail includes a strengthening section disposed above the adhesive section and a polish section disposed above the adhesive section.

22 Claims, 16 Drawing Sheets

(56) References Cited

U.S. PATENT DOCUMENTS

| | | | |
|---|---|---|---|
| 6,015,549 A * | 1/2000 | Cowperthwaite | A45D 31/00 424/401 |
| 6,481,444 B1 | 11/2002 | Lilley | |
| 6,705,327 B2 | 3/2004 | Tilson | |
| 6,797,261 B1 | 9/2004 | Le | |
| 6,803,394 B2 | 10/2004 | Lilley et al. | |
| 8,092,786 B2 * | 1/2012 | Park | A45D 31/00 424/61 |
| 8,820,332 B2 | 9/2014 | Barile | |
| 9,149,106 B2 | 10/2015 | Park | |
| 9,211,242 B2 | 12/2015 | Renard et al. | |
| 9,345,277 B2 | 5/2016 | Albera | |
| 9,597,272 B2 | 3/2017 | Li et al. | |
| 9,655,429 B2 * | 5/2017 | Park | A45D 29/001 |
| 9,655,430 B2 * | 5/2017 | Park | A45D 29/001 |
| 9,687,060 B2 | 6/2017 | Tran | |
| 9,956,160 B2 | 5/2018 | Luu | |
| 10,149,807 B1 | 12/2018 | Li et al. | |
| 10,264,867 B2 | 4/2019 | Lawrence | |
| 10,376,024 B2 * | 8/2019 | Yu | B44C 1/1733 |
| 2008/0159973 A1 | 7/2008 | Doan | |
| 2012/0315231 A1 | 12/2012 | Lin | |
| 2013/0220355 A1 * | 8/2013 | Park | A45D 29/001 132/73 |
| 2013/0263875 A1 | 10/2013 | Burgess et al. | |
| 2013/0333713 A1 | 12/2013 | Mehta | |
| 2014/0007894 A1 | 1/2014 | Gagnon | |
| 2014/0034074 A1 | 2/2014 | Schwartz | |
| 2015/0007846 A1 | 1/2015 | Weiburg et al. | |
| 2015/0342320 A1 * | 12/2015 | Watanabe | A61K 8/375 424/61 |
| 2016/0007713 A1 * | 1/2016 | Gouse | A61Q 3/02 132/200 |
| 2016/0135657 A1 | 5/2016 | Mao et al. | |
| 2016/0175212 A1 | 6/2016 | Zhou et al. | |
| 2016/0213580 A1 | 7/2016 | Zhen | |
| 2016/0220006 A1 | 8/2016 | Le et al. | |
| 2017/0049683 A1 | 2/2017 | Klang et al. | |
| 2017/0056306 A1 | 3/2017 | Zhen | |
| 2017/0151148 A1 | 6/2017 | Chen et al. | |
| 2017/0172280 A1 | 6/2017 | Malafarina | |
| 2017/0172281 A1 | 6/2017 | Crescimanno et al. | |
| 2018/0184780 A1 * | 7/2018 | Chevalier | A45D 29/00 |
| 2018/0184781 A1 | 7/2018 | Zhen | |
| 2018/0214364 A1 | 8/2018 | Fularska et al. | |
| 2018/0344588 A1 | 12/2018 | Vogel et al. | |
| 2018/0360189 A1 | 12/2018 | Vu | |
| 2018/0369093 A1 | 12/2018 | Tran | |
| 2019/0054000 A1 | 2/2019 | Gouse et al. | |
| 2019/0240897 A1 * | 8/2019 | Liu | B29C 64/147 |
| 2019/0328090 A1 * | 10/2019 | Yu | A44C 15/0005 |
| 2019/0374449 A1 | 12/2019 | Zhao et al. | |
| 2021/0196024 A1 * | 7/2021 | Um | C09J 133/08 |

FOREIGN PATENT DOCUMENTS

| | | |
|---|---|---|
| EP | 3536188 A1 | 9/2019 |
| WO | 0143579 A1 | 6/2001 |

\* cited by examiner

700

705 Remove the gel-based artificial nail in semi-cured state from a removable layer.

↓

710 Arrange the gel-based artificial nail in the semi-cured state onto the natural nail

↓

715 Cure the gel composition to a semi-cured state

FIG. 7

LIGHT-CURABLE ARTIFICIAL NAILS, METHODS OF PREPARATION AND METHODS OF USE THEREOF

RELATED APPLICATIONS

This application claims the benefit of Provisional Application No. 63/110,218, filed Nov. 5, 2020, the entire content of which are incorporated by reference herein.

FIELD

The present disclosure relates generally to artificial nails, and in particular to light-curable artificial nails, kits containing light-curable artificial nails, methods of preparation and use thereof.

BACKGROUND

Artificial nails have long been popular amongst consumers. Consumers use artificial nails to cosmetically enhance the appearance of nails and/or to protect them.

BRIEF DESCRIPTION OF THE DRAWINGS

FIG. 7 illustrates a method using light-curable artificial nails, in accordance with some embodiments.

BRIEF SUMMARY

Figure 1A:
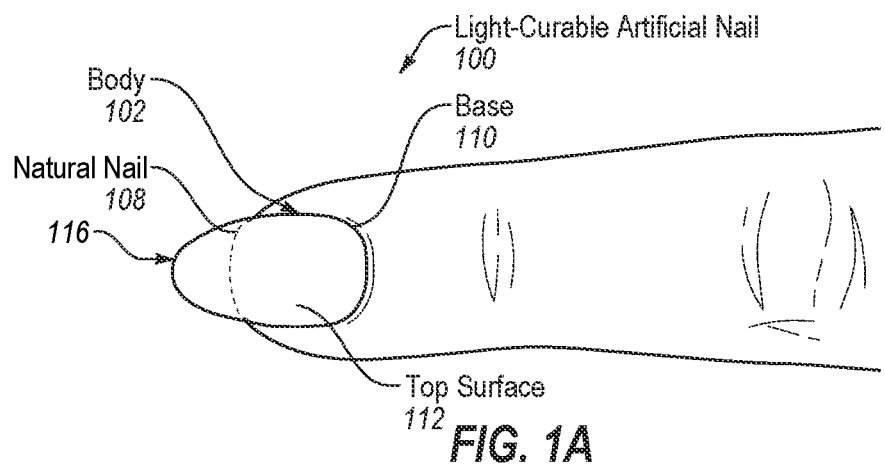
FIG. 1A illustrates a top-down view of a light-curable artificial nail applied to a natural nail, in accordance with some embodiments of the disclosure.

According to some embodiments, disclosed herein is a light-curable artificial nail, comprising an adhesive section comprising a light-curable composition in a semi-cured state, wherein the light-curable composition is configured to transition from the semi-cured state to a cured state based on exposure to at least one wavelength of electromagnetic radiation; a strengthening section disposed above the adhesive section; and a polish section disposed above the adhesive section.

In some embodiments, the light-curable composition of the adhesive section is a first light-curable composition, wherein the polish section comprises a second light-curable composition in the semi-cured state. In some embodiments the first light-curable composition is different than the second light-curable composition.

In some embodiments, the adhesive section is designed to secure the light-curable artificial nail to a natural nail with an application of pressure and the at least one wavelength of electromagnetic radiation.

In some embodiments, the light-curable artificial nail further comprises a decorative section disposed above the polish section, the decorative section comprising one or more decorations.

In some embodiments, the light-curable artificial nail further comprises a top coat section disposed above the polish section. In some embodiments, the light-curable composition of the adhesive section is a first light-curable composition, wherein the top coat section comprises a third light-curable composition in the semi-cured state, and wherein the first light-curable composition is different than the third light-curable composition. In some embodiments, the top coat section is transparent.

In some embodiments, strengthening section comprises a fabric material comprising at least one of fiberglass, silk, or linen.

In some embodiments, the polish section comprises a colorant.

In some embodiments, the light-curable composition comprises at least one component that is curable by ultraviolet (UV) light radiation, visible light radiation, or a combination thereof.

In some embodiments, the light-curable composition comprises at least one of a polymer, a film forming agent, a plasticizer, an additive, a dispersant, a photoinitiator, silicone, silicon, keratin, an ethylenically unsaturated monomer, an oligomer, an unreactive solvent or a colorant.

In some embodiments, the polymer comprises at least one of a polyurethane, a (meth)acrylic polymer, poly(methyl methacrylate), a copolymer, a vinyl polymer, a vinyl copolymer, a cellulose polymer or a styrene butadiene polymer.

In some embodiments, the film forming agent comprises at least one of an epoxy resin, a (meth)acrylic resin, a styrene resin, an acrylate-styrene resin, a vinyl resin, a polyester, an alkyd resin, a cellulose ester or a resin resulting from condensation of formaldehyde with an arylsulphonamide.

In some embodiments, the plasticizer comprises at least one of tributyl phosphate, tributoxyethyl phosphate, tricresyl phosphate, triphenyl phosphate, glycerol triacetate, butyl stearate, butyl glycolate, benzyl benzoate, butyl acetyltricinoleate, glyceryl acetyltricinoleate, dibutyl phthalate, diisobutyl phthalate, dioctyl phthalate, dimethoxyethyl phthalate, diamyl phthalate, triethyl citrate, tributyl citrate, tributyl acetylcitrate, tri(2-ethylhexyl)acetylcitrate, dibutyl tartrate or camphor.

In some embodiments, the additive comprises at least one of silica, fumed silica, diatomaceous earth, bentonite clay, kaolinite, pyrophyllite, sericite, a smectic, a vermiculite, montmorillinite, beidillite, nontronite, hectorite, talc, mica, zirconium oxide, zinc oxide, magnesium oxide, saponite, calcium stearate, zinc stearate, aluminum stearate, stearalkonium, distearalkonium, an organic modified clay, a hydrogenated castor oil, a hydrogenated castor oil wax, an inorganically modified castor oil, an organically modified castor oil, a triglyceride, glyceryl tri-12-hydroxy stearate, a polyamide, a polyamide wax, 12-hydroxystearic acid diamide of ethylene diamine, 12-hydroxystearic acid diglycolamide, N-stearyl ricinoleamide, N-stearyl stearamide, a polyethylene oxide wax, a urea urethane, an acrylic resin, an amine salt of a polymeric polyester, salts of linear polyaminoamide and polymeric polyester, an amide solution of polycarboxylic acid, alkyl sultanate, alkylallyl sultanate, colloidal ester, polyester resin, phenol resin, melamine resin, epoxy resin, urethane resin, a polyimide resin or a polyester amide.

In some embodiments, the dispersant comprises at least one of a non-surface active polymer, a surface-active component added to a gel or a surfactant.

In some embodiments, the light-curable composition comprises about 1 weight percentage (wt %) to about 50 wt % of a resin, about 1 wt % to about 50 wt % of a photoinitiator and about 1 wt % to about 90 wt % of a polymer.

In some embodiments, in the semi-cured state, the light-curable composition comprises a modulus of elasticity of about $100 \times 10^{-6}$ gigapascals (GPa) to about 2.50 GPa, and in the cured state the light-curable composition comprises a Rockwell hardness of about 1 gram per cubic centimeter (g/cc) to about 110 g/cc.

In some embodiments, the light-curable artificial nail is free of at least one of a pre-formed hard plastic or an acrylic polymer.

In some embodiments the light-curable artificial nail is in a shape of a natural nail, an ovular nail, a rectangular nail, a pointed nail, or a rounded nail.

In some embodiments, the polish section is disposed above the strengthening section.

According to some embodiments, disclosed herein is a kit, comprising a light-curable artificial nail configured for an application to a natural nail using pressure and at least one wavelength of electromagnetic radiation, comprising: an adhesive section comprising a light-curable composition in a semi-cured state, wherein the light-curable composition is configured to transition from the semi-cured state to a cured state based on exposure to the at least one wavelength of electromagnetic radiation; a strengthening section disposed above the adhesive section; a polish section disposed above the adhesive section; and a removable layer removably attached to the adhesive section.

In some embodiments, the kit further comprises a light emitting device configured to emit the at least one wavelength of electromagnetic radiation to transition the light-curable composition from the semi-cured state to the cured state.

In some embodiments, the light emitting device is configured to emit at least one of ultraviolet radiation or visible light radiation, wherein the light emitting device is configured to emit the at least one wavelength of electromagnetic radiation at a wavelength of about 100 nanometers (nm) to about 780 nm inclusive, wherein the light emitting device comprises a light emitting diode (LED).

In some embodiments, the light emitting device comprises one or more pressure members configured to apply pressure to a top side of the light-curable artificial nail while emitting the at least one wavelength of electromagnetic radiation.

In some embodiments the kit further comprises at least one stencil comprising an opening in a shape of a nail and a solid portion surrounding the opening, wherein the stencil is configured to overlay the light-curable artificial nail and to pass the at least one wavelength of electromagnetic radiation through the opening to the light-curable artificial nail and to block the at least one wavelength of electromagnetic radiation at the solid portion.

In some embodiments, the kit comprises at least one stencil, wherein the at least one stencil is (a) removably attached to the light emitting device, (b) in a form of a glove comprising openings configured in shapes of nails, (c) an opaque sticker, or (d) a fingerette comprising an opening configured in a shape of a nail.

In some embodiments, the at least one stencil is designed to apply pressure to a top side of the light-curable artificial nail when the light-curable artificial nail is positioned on a natural nail.

In some embodiments, the polish section is disposed above the strengthening section. In some embodiments the strengthening section comprises a fabric material. In some embodiments, the fabric material comprises at least one of fiberglass, silk, or linen.

According to some embodiments, disclosed herein is method of preparing a light-curable artificial nail, comprising: extracting from an adhesive film in a semi-cured state a portion of the adhesive film in a shape of a human nail, the portion of the adhesive film comprising a light-curable composition in the semi-cured state; extracting, from a polish film, a portion of the polish film in the shape of the human nail; and combining the portion of the adhesive film and the portion of the polish film with a strengthening material into layers of the light-curable artificial nail.

In some embodiments, the light-curable composition of the adhesive film is a first light-curable composition, wherein the polish film comprises a second light-curable composition configured in the semi-cured state.

In some embodiments, the first light-curable composition is different than the second light-curable composition.

In some embodiments, the method further comprises exposing the combined layers to first electromagnetic radiation for a first predetermined time period to bond respective adjacent layers of the combined layers together.

In some embodiments, exposing the combined layers to the first electromagnetic radiation for the first predetermined time period transitions one or more of the combined layers from a first semi-cured state to a second semi-cured state.

In some embodiments, the method further comprises disposing the first light-curable composition in an uncured state onto a first substrate to form the adhesive film; and exposing the adhesive film to second electromagnetic radiation for a second predetermined time period to transition the adhesive film from the uncured state to the semi-cured state.

In some embodiments, the method further comprises disposing the second light-curable composition in the uncured state onto a second substrate to form the polish film; and exposing the polish film to third electromagnetic radiation for a third predetermined time period to transition the polish film from the uncured state to the semi-cured state.

In some embodiments, the method further comprises disposing one or more decorations above the polish film.

In some embodiments, the method further comprises extracting from a top coat film a portion of the top coat film in the shape of the human nail; and combining the portion of the top coat film with the layers of the light-curable artificial nail.

In some embodiments, the top coat film comprises a third light-curable composition, the method further comprises: disposing the third light-curable composition in the uncured state onto a third substrate to form the top coat film; and exposing the top coat film to fourth electromagnetic radiation for a fourth predetermined time period to transition the top coat film from the uncured state to the semi-cured state.

In some embodiments, at least one of the polish film or the top coat film is formed from a non-light-curable composition.

In some embodiments, the portion of polish film is disposed above the strengthening material.

In some embodiments, the strengthening material comprises a fabric material.

In some embodiments, the fabric material comprises at least one of fiberglass, silk, or linen.

Numerous other features are provided in accordance with these and other aspects of the disclosure. Other features and aspects of the present disclosure will become more fully apparent from the following detailed description, the claims, and the accompanying drawings.

DETAILED DESCRIPTION

Artificial nails, such as artificial nail extensions, can be used to extend and decorate natural nails. Conventional artificial nails can include "press-on" nails or artificial nails applied by manicure professionals. Press-on nails can include acrylic nails formed of acrylic polymer-based compositions. Professional manicure service can build artificial nails on the natural nail using acrylic polymer-based compositions or gel-based compositions, for example.

To apply acrylic polymer-based artificial nails, a manicurist may clean the client's natural nails, cut the natural nails, trim the cuticles, buff the natural nails, apply a primer, apply a base coat, cure the base coat, apply the nail tip or full nail using an adhesive, apply another base coat to the nail tip or full artificial nail, cure the other base coat, apply a nail polish, cure the polish, and apply and cure a top coat. Artificial nails provided by professional manicures can look very realistic (e.g., like natural nails) at least because the layers of the artificial nail are built on top of the client's nail bed. However, professional manicures are expensive and time consuming and can take from 1.5 to 3 hours to complete. Further, professional manicures using, for example acrylic-based polish, can be easily chipped or scratched.

Conventional press-on artificial nails are much quicker to apply than professional manicured artificial nails. Such press-on artificial nails use a sticky glue, such as a cyanoacrylate-based adhesive to adhere the press-on artificial nail to the natural nail. The conventional press-on nails can be arranged and adhered to the natural nail using adequate pressure. However, conventional press-on nails often do not look like real nails at least because the demarcation between the natural nail and artificial nail is visible and pronounced. Additionally, the conventional press-on nail poorly adheres to the natural nail and easily detaches (e.g., pops off) during normal wear. Further, different individual have unique and differently sized and shaped natural nails. Press-on nails are formed of hard and/or inelastic pre-shaped plastic materials that does not conform to the unique shapes of natural nails. As such, press-on nails neither adhere securely to natural nails nor look like natural nails when applied.

Aspects of the disclosure address the above challenges as well as others by providing light-curable artificial nails that can be applied with the ease of press-on nails and appear natural like professional manicured artificial nails but with increased durability. In some embodiments, a light-curable artificial nail can have multiple sections (e.g., horizontal sections), where each section has one or more layers of similar material. The sections can be stacked on top of one another to form a light-curable artificial nail. At least one section of the light-curable artificial includes a light-curable composition, such as gel-based composition, that is semi-cured. The light-curable artificial nail made of semi-cured light-curable composition(s) can be elastic and/or flexible such that the light-curable artificial nail can bend, flex and/or stretch (e.g. be shaped) to conform to a unique shape of a natural nail, which improves the bond between the light-curable artificial nail and makes the light-curable artificial nail appear more natural than a press-on nail. Similar to a manicured nail that is built layer upon layer on an individual's natural nail and that conforms to the underlying natural nail, the light-curable artificial nail can be made of one or multiple-sections that include semi-cured light-curable composition(s). In some embodiments, the light-curable artificial nail may effectively serve as a pre-built manicured nail in semi-completed state (e.g., semi-cured). The light-curable artificial nail as applied to a natural nail can be similar in appearance to a professional manicure and have a similar strong bond to the natural nail but be applied with the ease of a press-on nail.

In some embodiments, the adhesive section of the light-curable artificial nail can include a light-curable composition, such as a gel-based base coat, that is semi-cured and remains tacky and sticky in the semi-cured state. A user can arrange a light-curable artificial nail on the natural nail, apply pressure to the light-curable artificial nail (using a pressure member, such as a nail form), and cure the light-curable artificial nail concurrently with the application of pressure, and in particular cure the adhesive section of the light-curable artificial nail, to form a strong bond between the natural nail and light-curable artificial nail. As noted above, the light-curable artificial nail in a semi-cured state can be flexible and/or elastic and conform to the shape and curvature of the natural nail such that the light-curable artificial nail can be arranged on the natural nail in a manner that reduces or eliminates visible demarcations between the natural nail and the light-curable artificial nail and improves the adhesive bond between the natural nail and light-curable artificial nail.

In some embodiments, multiple sections of the light-curable artificial nail can include light-curable compositions in a semi-cured state. For example, the adhesive section can include a light-curable composition and one or more of the polish section or top coat section can include the same or different light-curable composition (e.g., such as a gel-based nail polish or gel-based top coat section, respectively) in a semi-cured state.

In some embodiments, one or more of the sections of the light-curable artificial nail can include a non-light-curable composition. For example, the adhesive section can include a light-curable composition and one or more of the polish section or top coat section can include a non-light-curable composition.

In some embodiments, a section of the light-curable artificial nail can include strengthening material that can help provide strength and/or structure to the light-curable artificial nail. For example, a section of the light-curable artificial nail can include a fiberglass material disposed between other sections of the light-curable artificial nail.

In some embodiments, "light-curable" can refer to a substance (e.g., a composition) that can be chemically changed to form stronger and/or harder bonds upon exposure to specific wavelengths of electromagnetic radiation (e.g., light, such as ultra-violet (UV) light). For example, in some embodiments a light-curable composition can be cured by a polymerization process where the composition's molecules react by linking up with one another into large chains of polymers upon exposure to one or more wavelengths of light. Crosslinks, or chemical bonds, that connect different polymer chains together, also may be created, forming a structurally strong molecular network.

In some embodiments, a light-curable composition can include a gel composition. In some embodiments, a gel composition can be a composition that can be semi-solid in an uncured state. In some embodiments, the gel composition in an uncured or semi-cured state can include one or more oligomers. In some embodiments, the light-curable composition can be cured using UV electromagnetic radiation (or specific wavelengths of UV electromagnetic radiation).

In some embodiments, the term "semi-cured state" (e.g., partially cured) refers to a light-curable composition (or the light-curable composition(s) of the light-curable artificial nail, generally) that has been cured (e.g., by exposure to electromagnetic radiation) for less than an amount of time to fully cure the light-curable composition. In a semi-cured state, exposure to additional amounts (e.g., power and/or time) of specified wavelength(s) of electromagnetic radiation can cause the light-curable composition to further chemically change to form stronger and/or harder bonds. In some embodiments, the term "semi-cured state" refers to a light-curable composition (or light-curable artificial nail, generally) that is at least one of elastic, semi-solid, malleable, formable, clay-like, stretchable or combinations thereof and/or may have a Shore A (Durometer) hardness of less than about 90.

The term "cured state" refers to a light-curable composition (or light-curable composition(s) of a light-curable artificial nail, generally) that is hard, durable and resistant to breaking and/or has a Rockwell hardness of about 1 gram(s) per cubic centimeter (g/cc) to about 110 g/cc, and/or a Shore D hardness of about 10 to about 100. In a cured state, exposure to additional amounts (e.g., power and/or time) of specified wavelength(s) of electromagnetic radiation does not cause or does not appreciably cause the light-curable composition to further chemically change to form stronger and/or harder bonds. For example, in the cured state, the polymerization process can be substantially complete. In some embodiments, a light-curable artificial nail (e.g., the light-curable composition(s) therein) in a cured state is harder, more durable, and/or more resistant to breaking than a light-curable artificial nail in a semi-cured state (or uncured state).

Light-Curable Artificial Nail

According to embodiments, disclosed herein is a light-curable artificial nail. A light-curable artificial nail as described herein can be of any suitable type, color or shape. A light-curable artificial nail can be of any type including, but not limited to, a full-cover nail, a partial nail portion, a nail tip, or combinations thereof. In some embodiments, a light-curable artificial nail is a type of press-on artificial nail (e.g., light-curable press-on artificial nail). For example, the light-curable artificial nail can be a light-curable press-on artificial nail that can be secured to a natural nail using one or more of an exposure to one or more specified wavelengths of magnetic radiation and/or an application pressure (e.g., concurrent with the exposure). The light-curable artificial nail can be an artificial fingernail or an artificial toenail. Suitable colors of light-curable artificial nails according to embodiments herein can include, but are not limited to, every color in the visible light spectrum, such as red, orange, yellow, green, blue, purple, brown, black, white, pink or combinations thereof. A suitable shape of the light-curable artificial nail as described herein includes, but is not limited to, a natural nail, square tip, oval tip, round tip, square with round edges, pointed tip, V-shaped tip, curved downward, claw-shaped, trapezoidal (e.g., from cuticle to tip), triangular (e.g., from cuticle to tip) or combinations thereof.

Figure 1B:
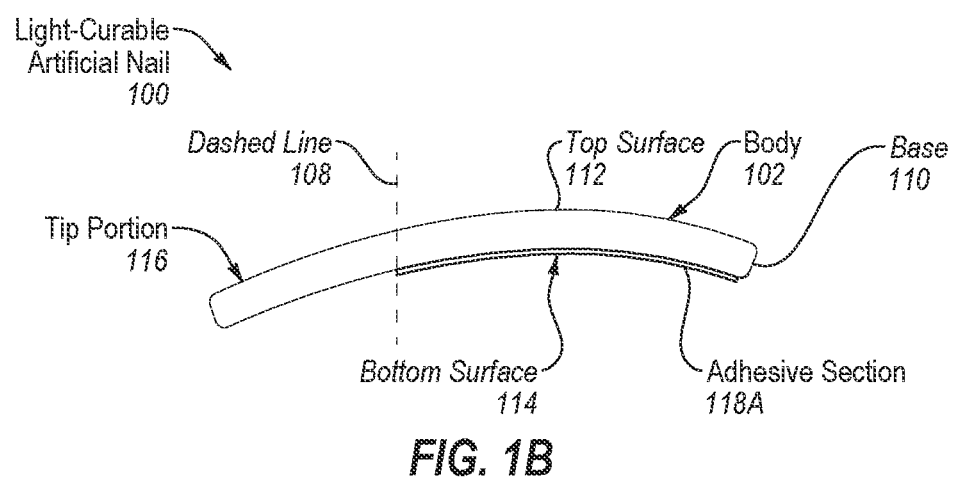
FIG. 1B illustrates a side view of light-curable artificial nail, in accordance with some embodiments.
Figure 1C:
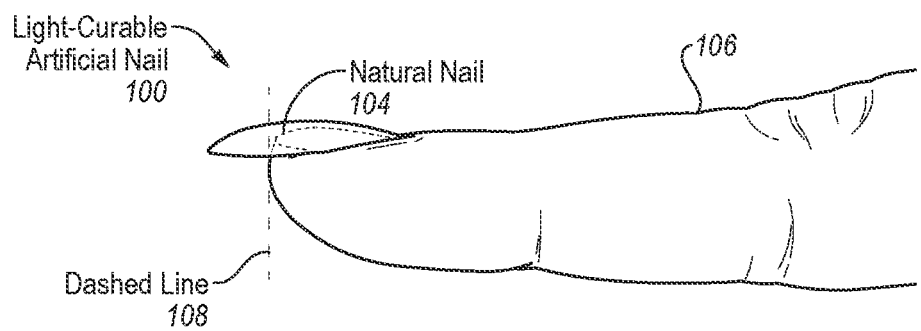
FIG. 1C illustrates a side view of light-curable artificial nail applied to a natural nail, in accordance with some embodiments.
Figure 1D:
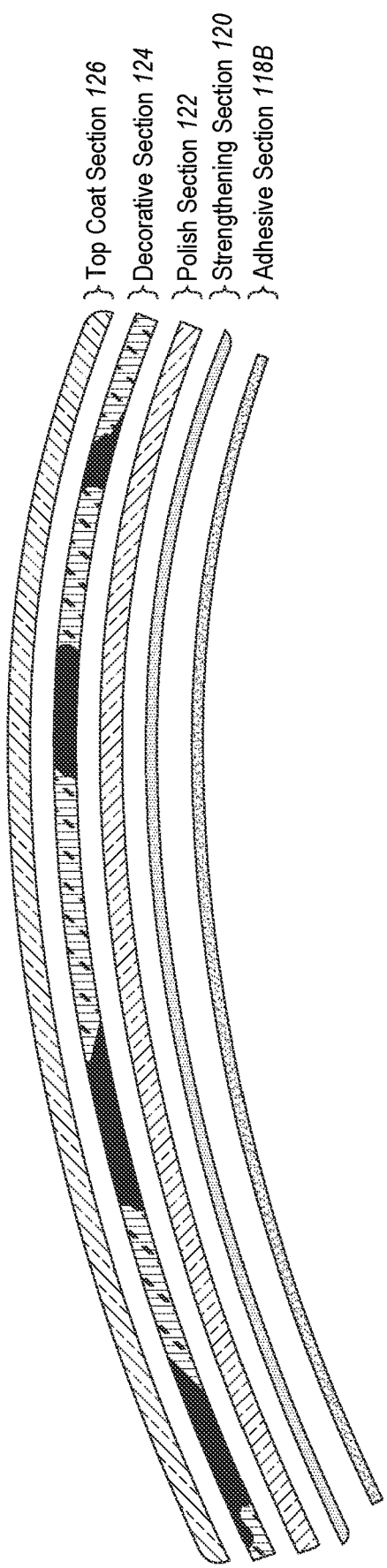
FIG. 1D illustrates an exploded side view of a section stack-up of a light-curable artificial nail, in accordance with some embodiments.

FIGS. 1A-1D illustrate a light-curable artificial nail suitable for application onto a natural nail (e.g., a fingernail), in accordance with some embodiments herein. FIG. 1A illustrates a top-down view of a light-curable artificial nail applied to a natural nail, in accordance with some embodiments of the disclosure. FIG. 1B illustrates a side view of light-curable artificial nail, in accordance with some embodiments. FIG. 1C illustrates a side view of light-curable artificial nail applied to a natural nail, in accordance with some embodiments. FIG. 1D illustrates an exploded side view of a section stack-up of a light-curable artificial nail, in accordance with some embodiments.

In some embodiments, the light-curable artificial nail 100 includes a body 102 having a shape that at least in part corresponds to the shape of the natural nail 104. The body 102 may be configured to overlay the user's natural nail 104 and conform to the shape of the natural nail 104. For example, the body 102 may overlay the bed of the natural nail 104 (illustrated in FIG. 1C as the curved dashed line under the light-curable artificial nail 100) from the cuticle to the fingertip (as represented by dashed line 108), and in some cases extends beyond the fingertip. As such, the body 102 may include a base 110 (also referred to as "base portion 110" herein) that extends from one end of the light-curable artificial nail 100 (e.g., bed of light-curable artificial nail illustrated adjacent to the cuticle of the user's finger) to the area represented by dashed line 108. In some embodiments, the body 102 may not extend all the way to the fingertip (or dashed line of the natural nail 104 in FIG. 1A). In some embodiments, the body 102 may extend from the cuticle to a length of about 1 millimeter (mm) to about 3 mm before or after the fingertip. A shorter body 102 may be useful when a user does not want the light-curable artificial nail 100 to extend beyond the user's fingertip (or toe tip). In some embodiments, the body 102 may extend further from the cuticle.

As shown in FIGS. 1A and 1B, the body 102 includes a top surface 112 opposing a bottom surface 114. Top surface 112 is outwardly visible to the user and others when the light-curable artificial nail is attached to the user's finger (or toe). Bottom surface 114 may be configured to adhere and conform to the natural nail 104 or at least a portion thereof, which may or may not include a top coat or other composition on the surface thereof.

In some embodiments, the body 102 of light-curable artificial nail 100 includes a tip portion 116 configured to extend from the body 102 in a distal direction. According to some embodiments, tip portion 116 may extend beyond a user's fingertip (or toe tip), represented by dashed line 108 in FIGS. 1B-1C, in the distal direction. In some embodiments, the tip portion 116 extends the length of the light-curable artificial nail 100 from the area represented by dashed line 108 to the distal tip of the body 102. In some embodiments, tip portion 116 may extend from the base portion 110 of the body 102 (e.g., about 1 mm to about 3 mm before or after the fingertip) to the distal tip of the light-curable artificial nail 100.

As shown in FIGS. 1A and 1B, tip portion 116 and the base 110 (e.g., base portion 110) are monolithic and form a single piece. In some embodiments, the body 102 can only include tip portion 116 and not the base portion 110. In further embodiments, tip portion 116 may be coupled to base portion 110, for example, using adhesive or other fastening means (e.g., non-monolithic). Tip portion 116 can include a top surface and a bottom surface. In some embodiments, none, some or the entire bottom surface of the tip portion 116 may be configured with an adhesive section.

In some embodiments, one or more of the base portion 110 or tip portion 116 includes a colorant. In some embodiments, the base portion 110 includes a first colorant and the tip portion 116 includes a second colorant. In certain embodiments, at least part of the base portion 110 (e.g., a bottom portion) of body 102 near the cuticle includes a first colorant in the shape of a lunula and the remaining portion of body 102 includes a second colorant. In some embodiments, at least part of the tip portion 116 of the body 102 (e.g., the end tip or distal end of the light-curable artificial nail 100) include one or more colorants and the remaining portion of the body 102 includes at least one different colorant (e.g., French manicure).

In some embodiments, the light-curable artificial nail 100 is configurable from a planar position to a concave position. For example, the light-curable artificial nail can be peeled off a removable layer (e.g., a backing) and formed into the shape of the natural nail. In further embodiments, the light-curable artificial nail may be packaged in a concave position (e.g., bottom surface 114) where the removal layer holds the artificial nail in the concave position.

In some embodiments, body 102 of the light-curable artificial nail includes and/or is formed of one or more light-curable compositions configured in a semi-cured state. In some embodiments, a light-curable composition can include a gel-based composition. In some embodiments, the one or more light-curable compositions may be exposed to electromagnetic radiation (also referred to as "light" herein) for a predetermined amount of time (e.g., a period of about 10 sec to about 15 min, or about 30 sec to about 10 min, or about 60 sec to about 5 min) to transition the one or more light-curable compositions from a non-cured state to the semi-cured state (e.g., during manufacturing).

In some embodiments, the term "non-cured state" refers to a light-curable composition that is liquid, e.g., having a viscosity of less than about 400 mPas as measured at 25° C. by a Cone & Plate viscometer using a 40 Poise cone fitted 19.1 mm diameter and 2° angle rotating at 750 RPM, according to ASTM D4287-00 (e.g., example viscometer is the REL Model CPD2000), a slurry and/or is flowable.

In some embodiments, in a semi-cured state, the one or more light-curable compositions maintains a level of elasticity whereas in a fully cured state the one or more light-curable compositions may be almost or fully inelastic (at least in comparison to the light-curable compositions in a semi-cured state). When the light-curable artificial nail 100 is in the semi-cured state, the body 102 of the light-curable artificial nail 100 may be at least one of elastic, semi-solid, bendable, flexible, elastic, malleable, formable, clay-like, stretchable or combinations thereof to facilitate conformance of the shape of the light-curable artificial nail 100 to the shape of the natural nail 104. In some embodiments, when in the semi-cured state the one or more light-curable compositions of the light-curable artificial nail 100 may have a modulus of elasticity of about $100 \times 10^{-6}$ gigapascals (GPa) to about 2.50 GPa. In some embodiments, when in the cured state one or more of the light-curable compositions of the light-curable artificial nail 100 may have a modulus of elasticity that is greater than the modulus of elasticity of the respective light-curable composition in the semi-cured state. For example, the modulus of elasticity of a particular light-curable composition of the light-curable artificial nail in the cured state can be greater than 2.50 GPa.

In some embodiments, the one or more light-curable compositions may be configured to transition from the semi-cured state to a cured state based on exposure of the one or more light-curable compositions to a specified wavelength(s) of electromagnetic radiation. For example, a light-curable composition may be curable when exposed to at least one specified wavelength (or a range of wavelengths) of electromagnetic radiation, such as UV radiation. When in the cured-state, the light-curable artificial nail including body 102 may be substantially inelastic. For example, in the cured state, the light-curable composition of the light-curable artificial nail may have a Rockwell hardness of about 1 g/cc to about 110 g/cc, or about 5 g/cc to about 90 g/cc, or about 10 g/cc to about 80 g/cc, or about 20 g/cc to about 50 g/cc, and/or a Shore D hardness of about 10 to about 100, or about 30 to about 80.

According to some embodiments, body 102 is in a semi-cured state and has a first rigidity to provide support while maintaining a curvature corresponding to a curvature of the natural nail 104. In some embodiments, the first rigidity may be represented as a Shore A (Durometer) hardness of about 25 to about 90, or about 30 to about 80, or about 40 to about 75. In a cured state, body 102 has a second rigidity that is more rigid than the first rigidity. In some embodiments, the second rigidity may be represented as a Rockwell hardness of about 1 g/cc to about 110 g/cc, or about 5 g/cc to about 90 g/cc, or about 10 g/cc to about 80 g/cc, or about 20 g/cc to about 50 g/cc, and/or a Shore D hardness of about 10 to about 100, or about 30 to about 80.

In some embodiments, the light-curable artificial nail 100 in the semi-cured state is more elastic than the light-curable artificial nail 100 in the cured state. A light-curable artificial nail 100 in a semi-cured state can refer to a light-curable artificial nail having one or more (or all) of the light-curable compositions (e.g., including one or more layers and/or one or more sections) of the light-curable artificial nail in a semi-cured state. A light-curable artificial nail in a cured state can refer to a light-curable artificial nail having one or more light-curable compositions (or all) (e.g., including one or more layers and/or one or more sections) of the light-curable artificial nail in a cured-state.

It can be noted that using light-curable composition(s) in the light-curable artificial nail has been described for purposes of illustration, rather than limitation. In other embodiments, the one or more other curable compositions can be used to form the light-curable artificial nail 100 and cured using one or more modalities such as curing induced by additional curing agents, drying, heat, etc.

The body 102 of the light-curable artificial nail 100 according to some embodiments herein may further include an adhesive section 118A having a first surface opposing a second surface. Section and layers of the light-curable artificial nail 100 are further described with respect to FIG. 1D. The first surface of the adhesive section 118A may be disposed on or coupled to at least a portion of bottom surface of a directly adjacent section. The second surface of the adhesive section 118A may be configured to adhere to at least a portion of natural nail 104. In some embodiments, the adhesive section 118A may cover only a portion of bottom surface of the directly adjacent section and/or only a portion of natural nail 104. In some embodiments, the adhesive section 118A can cover part of the entire bottom surface of a directly adjacent section of the light-curable artificial nail 100. For example, the adhesive section 118A can cover the base portion 110 of light-curable artificial nail 100 and not the entirety of the tip portion 116 of the light-curable artificial nail 100. In some embodiments, the adhesive section 118A can cover none, part, or the entire bottom surface of the directly adjacent section of the light-curable artificial nail 100. In some embodiments, the adhesive section 118A may be of a substantially uniform thickness.

The exploded side view of a light-curable artificial nail 100, as shown in FIG. 1D, illustrates a stack-up of various sections of the light-curable artificial nail 100, in accordance with some embodiments. Light-curable artificial nail 100 is shown with an adhesive section 118B (also referred to as "base coat section 118" herein), strengthening section 120 (also referred to as "structure section 120" herein), polish section 122, decorative section 124, and top coat section. A section of light-curable artificial nail 100 can include one or more layers of the same or similar material or composition. It should be noted that the various sections of light-curable artificial nail 100 as illustrated in FIG. 1D are provided for purposes of illustration rather than limitation. In some embodiments, the various sections can be ordered in in a different order. In some embodiments, the light-curable artificial nail 100 can include the same, different, fewer or more sections arranged in the same or different order. In some embodiments, one or more of a particular section can be included in the light-curable artificial nail 100. In some embodiments, some sections can be omitted. It should be further noted that FIG. 1D illustrates an exploded view of the stack-up and that in some embodiments, the various sections (and layers there within the sections) are connected to respective adjacent sections (or respective layers) of the light-curable artificial nail 100. It can be noted that adhesive section 118A and adhesive section 118B are generally referred to as adhesive section 118.

In some embodiments and as noted above, adhesive section 118 can include a light-curable composition that is configured in a semi-cured stated. For example, the adhesive section 118 can include a gel-based base coat that has been exposed to a predetermined wavelength of electromagnetic radiation such that gel-based base coat is cured to a semi-cured state and is tacky and/or sticky. In some embodiments, the light-curable composition of the adhesive section 118 is configured to transition from the semi-cured state to a cured stated based on exposure to at least one wavelength (e.g., predetermined wavelength) of electromagnetic radiation.

In some embodiments, the light-curable composition of the adhesive section 118 is configured to be a different composition, and in some instances, a different light-curable composition than included in other sections of the light-curable artificial nail 100.

In some embodiments, the adhesive section 118 (an in particular the light-curable composition of the adhesive section 118) is designed to secure light-curable artificial nail to a natural nail with the application of at least one of the predetermined wavelength(s) of electromagnetic radiation or pressure (e.g., pressure on the top of the light-curable artificial nail 100 towards the direction of the natural nail). In some embodiments, the pressure is to be applied concurrently with the exposure of the at least one of the predetermined wavelength(s) of electromagnetic radiation.

In some embodiments, the adhesive section 118 can include one or more layers, such as one or more layers of light-curable composition. In some embodiments, the one or more layers of the adhesive section 118 can be the same or similar material. In some embodiments, the one or more layers of the adhesive section 118 can include different materials. In some embodiments, the one or more layers of the adhesive section 118 can be semi-cured in different amounts where some layers are more semi-cured than other layers (e.g., more chemically changed with larger, stronger and/or harder bonds). In some embodiments, all the layers of the adhesive section 118 are semi-cured. In other embodiments, some of the layers of the adhesive section 118 are semi-cured and some are not semi-cured. In some embodiments, the external layer (e.g., bottom surface 114) is semi-cured, while one or more other layers of the adhesive section 118 are either cured or more semi-cured than the external layer of the adhesive section 118.

In some embodiments, the light-curable composition of the adhesive section 118 can be curable using the one or more predetermined wavelengths of electromagnetic radiation. In some embodiments, the adhesive section 118 can be curable using one or more wavelengths that are different from the wavelength(s) of electromagnetic radiation that are used to cure the light-curable composition of other sections.

In some embodiments, the adhesive section 118 in the semi-cured state has a viscoelasticity, removability and re-adhesiveness. In some embodiments, the adhesive section 118 is applied during manufacturing of the light-curable artificial nail. In other embodiments, a user can apply an adhesive section 118 to the bottom surface of the light-curable artificial nail or to the natural nail prior to the application of the light-curable artificial nail 100.

In some embodiments, light-curable artificial nail 100 includes one or more strengthening sections 120. In some embodiments, a strengthening section 120 can add strength or structure to the light-curable artificial nail 100. For example, the strengthening section 120 can include a material that is flexible but less elastic than materials or compositions used in one or more other sections of the light-curable artificial nail 100. For example, the strengthening section 120 can be less elastic than one or more of the adhesive section 118 (in the semi-cured state), the polish section 122 (in the semi-cured state), decorative section 124 or top coat section 126 (in the semi-cured state). In some embodiments, the strengthening section 120 is designed to be thinner than one or more other sections of the light-curable artificial nail 100 such that the light-curable artificial nail (in the semi-cured or cured state) can have more structure (than without the strengthening section 120) but still be a lower profile and appear more like a natural nail.

In some embodiments, the strengthening section 120 can include a fabric material, such as a woven fabric or strands of a fabric. In some embodiments, the fabric material can include one or more of fiberglass (woven fabric or individual fiberglass strands), linen (woven fabric or strands) or silk (woven fabric or strands). In other embodiments, different materials or fabrics can be used in the strengthening section 120. In some embodiments, the strengthening section 120 does not include a light-curable composition.

In some embodiments the strengthening section 120 can have one or more layers, such as one or more layers of fabric material. In some embodiment, strengthening section 120 can include a single layer, such as a single layer of fabric material.

In some embodiments, strengthening section 120 is disposed between or directly between adhesive section 118 and polish section 122. In some embodiments, strengthening section 120 can be disposed between or directly between layers of a particular section (e.g., within a section such that the strengthening section 120 is embedded within the section). For example, strengthening section 120 can be disposed within (e.g., directly between layers) of the adhesive section 118. In another example, strengthening section 120 can be disposed within (e.g., directly between layers) of polish section 122.

In some embodiments, strengthening section 120 can be disposed between or directly between different sections than as illustrated. For example, strengthening section 120 can be located between or directly between polish section 122 and top coat section 126.

In still other embodiments, strengthening section 120 can be located between or directly between sections of the same type. For example, strengthening section 120 can be located between or directly between adhesive section 118 and another adhesive section located above or directly above the strengthening section 120. In another example, strengthening section 120 can be located between the polish section 122 and another polish section located above or directly above the strengthening section 120.

In some embodiments, light-curable artificial nail 100 can include one or more polish sections, such as polish section 122. Each polish section 122 can include one or more layers of the same or similar material.

In some embodiments, polish section 122 includes a light-curable composition. In some embodiments, the light-curable composition of the polish section 122 is different than the light-curable composition of other sections, such as the light-curable composition of the adhesive section 118. In some embodiments, the light-curable composition is a gel-based light-curable composition.

In some embodiments, the light-curable composition includes a colorant. In some embodiments, the light-curable composition can include particles, such as reflective particles including mica.

In some embodiments, the light-curable composition can include features that represent a natural nail, such as the lunula, nail plate, and/or free edge of the nail. In some embodiments, the features can be formed using light-curable composition with different colorants to represent the features.

In some embodiments, the one or more light-curable compositions of the polish section 122 are in a semi-cured state.

In some embodiments, the polish section 122 does not include a light-curable composition. In some embodiments, the polish section 122 includes one or more layers of an acrylic-based nail polish. In some embodiments, the non-light-curable composition of the polish section 122 can include one or more of a resin (e.g., film-forming and/or adhesive), such as nitrocellulose or other polymers, a solvent (e.g., ethyl acetate, butyl acetate, propyl acetate, and isopropyl acetate), a dispersant (e.g., stearalkonium hectorite, stearalkonium bentonite), UV stabilizer(s) (e.g., benzophenone), or plasticizers (e.g., trimethyl pentanyl diisobutyrate, triphenyl phosphate, camphor, and ethyl tosylamide). For example, a non-light-curable composition of the polish section 122 can include a polymer dissolved in a solvent. The solvent can evaporate after application to form a polymer film.

In some embodiments, a non-light-curable composition is not curable or not appreciably curable using electromagnetic radiation. In some embodiments, a non-light-curable composition can include a composition that may not be curable or not be appreciably curable under a wavelength of electromagnetic radiation outside the visible spectrum. In some embodiments, the non-light-curable composition can include a composition that is not curable or not appreciably curable under UV electromagnetic radiation. In some embodiments, the non-light-curable composition does not include a semi-cured state. In some embodiments, the non-light-curable composition is not in a semi-solid state in a semi-cured state (e.g., not a gel). In some embodiments, a non-light-curable composition does not include an oligomer (e.g., in an uncured or semi-cured state). In some embodiments, the non-light-curable composition can be cured using a free radical reaction when a powder is exposed to a reactive monomer in the liquid.

In some embodiments, light-curable artificial nail 100 can include a decorative section 124. In some embodiments, decorative section 124 can includes one or more decorations such as an embellishment (e.g., a jewel, a bead, a crystal, a metal emblem, a rivet, a pearl, etc.), nail art (e.g., paintings), decal, sticker, dust, reflective particles (e.g., mica, glitter), confetti, images, graphic prints, negative space, fluids, one or more colors, patterns, nail tip art or nail tip embellishment (s), or combinations thereof.

In some embodiments, the decorative section 124 can be disposed above or on the polish section 122. In some embodiments, the decorative section 124 is disposed within another sections, such as within the polish section 122. In some embodiments, the decorative section 124 can be disposed between or directly between the polish section 122 and top coat section 126. In some embodiments, the decorative section 124 can be disposed within the top coat section 126. In some embodiments, the decorative section 124 can be disposed above or on the top coat section 126.

In some embodiments, the decorative section 124 can be disposed on a combination of sections. For example, one or more decorations of the decorative section 124 can be disposed between the polish section 122 and top coat section 126 and one or more other decorations of the decorative section 124 can be disposed above or on the top coat section 126.

In some embodiments, light-curable artificial nail 100 can includes a top coat section 126. In some embodiments, the top coat section 126 can be the upper most section of the light-curable artificial nail 100. In some embodiments, top coat section 126 can include one or more layers of the same or similar material.

In some embodiments, the top coat section 126 can be a protective section that protects the sections below the top coat section 126. For example, the top coat section 126 can help protect the light-curable artificial nail 100, and in particular the polish section 122 and/or decorative section 124 from chipping. In some embodiments, the top coat section 126 can be transparent or partially transparent. In some embodiments, the top coat section 126 can be glossy and/or have shine.

In some embodiments, the top coat section 126 is disposed above or directly above the polish section 122. In some embodiments, the top coat section 126 is disposed above or directly above the decorative section 124.

In some embodiments, the top coat section 126 can include a light-curable composition. In some embodiments, the light-curable composition of the top coat section 126 is different than one or more of the light-curable compositions of other sections of the light-curable artificial nail 100. For example, the light-curable composition of the top coat section 126 can be different from the light-curable composition of the adhesive section 118 and/or the light-curable composition of the polish section 122.

In some embodiments, the light-curable composition of one or sections can be the same light-curable composition as another one or more sections of the light-curable artificial nail. For example, the light-curable composition of the adhesive section 118 can be the same light-curable composition as the light-curable composition of the polish section 122, in some embodiments. The light-curable composition of the polish section 122 can be the same light-curable composition of the top coat section 126, in some embodiments.

In some embodiments, the light-curable composition is semi-cured making the top coat section 126 a semi-cured light-curable section in a semi-cured state. In some embodiments, the top coat section 126 is in a cured state.

In some embodiments, the composition of the top coat section 126 includes a non-light-curable composition. In some embodiments, the non-light-curable composition of the top coat section 126 can include one or more of a resin (e.g., film-forming and/or adhesive), such as nitrocellulose or other polymers, a solvent (e.g., ethyl acetate, butyl acetate, propyl acetate, and isopropyl acetate), or a plasticizer. In some embodiments, the top coat section 126 includes a cellulose-based component, such as nitrocellulose. In some embodiments, the amount (e.g., wt %) of cellulose-based component is greater than in other sections of the light-curable artificial nail 100 (e.g., to provide added gloss and/or shine).

In some embodiments, multiple sections of the light-curable artificial nail can include a light-curable composition. In some embodiments where multiple sections includes a light-curable composition, the different sections may be in different cured states. For example, the light-curable composition of the adhesive section 118 may be in a semi-cured state, while other sections may be in a cured state (e.g., may not be in a semi-cured state). In some embodiments, the different sections may have different cure amounts (e.g., percentage), but be in the same cure state. For example, the adhesive section 118 and polish section 122 may both be in a semi-cured state, but at different amounts (e.g., percentages) of semi-cured. For instance, the adhesive section 118 can be 50 percent (%) cured while the polish section 122 is 80% cured.

In some embodiments, the light-curable composition is present in any one or more of the adhesive section 118, the polish section 122 and/or the top coat section 126 (i.e., the gel coat) independently in an amount of about 0.1 wt % to about 100 wt % of the total weight of the adhesive section 118, the polish section 122 and/or the top coat section 126, respectively. The light-curable composition may include at least one of a polymer, a film forming agent, a plasticizer, an additive, a dispersant, a photoinitiator, silicone, silicon, keratin, an ethylenically unsaturated monomer, an oligomer, an unreactive solvent or a colorant. In some embodiments, the light-curable composition includes a polymer in an amount of about 0.1 wt % to about 100 wt %, about 1 wt % to about 99 wt %, about 5 wt % to about 95 wt %, about 10 wt % to about 90 wt %, about 15 wt % to about 85 wt %, about 20 wt % to about 80 wt %, about 25 wt % to about 75 wt % of the total weight of the light-curable composition, or any individual value or sub-range within these ranges. In some embodiments, the polymer includes at least one of a polyurethane, a (meth)acrylic polymer, poly(methyl methacrylate), a copolymer, a vinyl polymer, a vinyl copolymer, a cellulose polymer or a styrene butadiene polymer. Any of the aforementioned polymer components may be present in the light-curable composition individually in an amount of about 0.1 wt % to about 100 wt %, about 1 wt % to about 99 wt %, about 5 wt % to about 95 wt % about 10 wt % to about 90 wt %, about 15 wt % to about 85 wt %, about 20 wt % to about 80 wt %, about 25 wt % to about 75 wt % of the total weight of the light-curable composition, or any individual value or sub-range within these ranges. In some embodiments, mixtures of any two or more of the aforementioned polymer components may be present in an amount about 0.1 wt % to about 100 wt %, about 1 wt % to about 99 wt %, about 5 wt % to about 95 wt %, about 10 wt % to about 90 wt %, about 15 wt % to about 85 wt %, about 20 wt % to about 80 wt %, about 25 wt % to about 75 wt % of the total weight of the light-curable composition, or any individual value or sub-range within these ranges.

In some embodiments, the light-curable composition includes a film forming agent. The film forming agent may be present in an amount of about 0.1 wt % to about 20 wt % of the total weight of the light-curable composition, or any individual value or sub-range within this range. The film forming agent may include at least one of an epoxy resin, a (meth)acrylic resin, a styrene resin, an acrylate-styrene resin, a vinyl resin, a polyester, an alkyd resin, a cellulose ester or a resin resulting from condensation of formaldehyde with an arylsulphonamide. Any of the aforementioned film forming components may be present in the light-curable composition individually in an amount of about 0.1 wt % to about 20 wt %, about 1 wt % to about 19 wt %, about 2 wt % to about 18 wt %, about 5 wt % to about 15 wt % of the total weight of the light-curable composition, or any individual value or sub-range within these ranges. In some embodiments, mixtures of any two or more of the aforementioned film forming components may be present in an amount about 0.1 wt % to about 20 wt %, about 1 wt % to about 19 wt %, about 2 wt % to about 18 wt %, about 5 wt % to about 15 wt % of the total weight of the light-curable composition, or any individual value or sub-range within these ranges.

In some embodiments, the light-curable composition includes a plasticizer. The plasticizer may be present in an amount of about 0.1 wt % to about 100 wt %, about 1 wt % to about 99 wt %, about 5 wt % to about 95 wt %, about 10 wt % to about 90 wt %, about 15 wt % to about 85 wt %, about 20 wt % to about 80 wt %, about 25 wt % to about 75 wt % of the total weight of the light-curable composition, or any individual value or sub-range within these ranges. In some embodiments, the plasticizer includes at least one of tributyl phosphate, tributyl phosphate, tributoxyethyl phosphate, tricresyl phosphate, triphenyl phosphate, glycerol triacetate, butyl stearate, butyl glycolate, benzyl benzoate, butyl acetyltricinoleate, glyceryl acetyltricinoleate, dibutyl phthalate, diisobutyl phthalate, dioctyl phthalate, dimethoxyethyl phthalate, diamyl phthalate, triethyl citrate, tributyl citrate, tributyl acetylcitrate, tri(2-ethylhexyl)acetylcitrate, dibutyl tartrate or camphor. about 0.1 wt % to about 100 wt %, about 1 wt % to about 99 wt %, about 5 wt % to about 95 wt %, about 10 wt % to about 90 wt %, about 15 wt % to about 85 wt %, about 20 wt % to about 80 wt %, about 25 wt % to about 75 wt % of the total weight of the light-curable composition, or any individual value or sub-range within these ranges. In some embodiments, mixtures of any two or more of the aforementioned polymer components may be present in an amount about 0.1 wt % to about 100 wt %, about 1 wt % to about 99 wt %, about 5 wt % to about 95 wt %, about 10 wt % to about 90 wt %, about 15 wt % to about 85 wt %, about 20 wt % to about 80 wt %, about 25 wt % to about 75 wt % of the total weight of the light-curable composition, or any individual value or sub-range within these ranges.

In some embodiments, the light-curable composition includes an additive. The additive may be present in an amount of about 0.1 wt % to about 100 wt %, about 1 wt % to about 99 wt %, about 5 wt % to about 95 wt %, about 10 wt % to about 90 wt %, about 15 wt % to about 85 wt %, about 20 wt % to about 80 wt %, about 25 wt % to about 75 wt % of the total weight of the light-curable composition, or any individual value or sub-range within these ranges. In some embodiments, the additive includes at least one of silica, fumed silica, diatomaceous earth, bentonite clay, kaolinite, pyrophyllite, sericite, saponite, a smectic, a vermiculite, montmorillinite, beidillite, nontronite, hectorite, talc, mica, zirconium oxide, zinc oxide, magnesium oxide, saponite, calcium stearate, zinc stearate, aluminum stearate, stearalkonium, distearalkonium, an organic modified clay, a hydrogenated castor oil, a hydrogenated castor oil wax, an inorganically modified castor oil, an organically modified castor oil, a triglyceride, glyceryl tri-12-hydroxy stearate, a polyamide, a polyamide wax, 12-hydroxystearic acid diamide of ethylene diamine, 12-hydroxystearic acid diglycolamide, N-stearyl ricinoleamide, N-stearyl stearamide, a polyethylene oxide wax, a urea urethane, an acrylic resin, an amine salt of a polymeric polyester, salts of linear polyaminoamide and polymeric polyester, an amide solution of polycarboxylic acid, alkyl sultanate, alkylallyl sultanate, colloidal ester, polyester resin, phenol resin, melamine resin, epoxy resin, urethane resin, a polyimide resin or a polyester amide. In some embodiments, any one of the aforementioned additives may be present in an amount of about 0.1 wt % to about 100 wt %, about 1 wt % to about 99 wt %, about 5 wt % to about 95 wt %, about 10 wt % to about 90 wt %, about 15 wt % to about 85 wt %, about 20 wt % to about 80 wt %, about 25 wt % to about 75 wt % of the total weight of the light-curable composition, or any individual value or sub-range within these ranges. In some embodiments, mixtures of any two or more of the aforementioned additives may be present in an amount about 0.1 wt % to about 100 wt %, about 1 wt % to about 99 wt %, about 5 wt % to about 95 wt %, about 10 wt % to about 90 wt %, about 15 wt % to about 85 wt %, about 20 wt % to about 80 wt %, about 25 wt % to about 75 wt % of the total weight of the light-curable composition, or any individual value or sub-range within these ranges.

In some embodiments, the light-curable composition includes a dispersant. The dispersant may be present in an amount of about 0.1 wt % to about 100 wt %, about 1 wt % to about 99 wt %, about 5 wt % to about 95 wt %, about 10 wt % to about 90 wt %, about 15 wt % to about 85 wt %, about 20 wt % to about 80 wt %, about 25 wt % to about 75 wt % of the total weight of the light-curable composition, or any individual value or sub-range within these ranges. In some embodiments, the dispersant includes at least one of a non-surface active polymer, a surface-active component added to a gel or a surfactant. In some embodiments, any one of the aforementioned dispersants may be present in an amount of about 0.1 wt % to about 100 wt %, about 1 wt % to about 99 wt %, about 5 wt % to about 95 wt %, about 10 wt % to about 90 wt %, about 15 wt % to about 85 wt %, about 20 wt % to about 80 wt %, about 25 wt % to about 75 wt % of the total weight of the light-curable composition, or any individual value or sub-range within these ranges. In some embodiments, mixtures of any two or more of the aforementioned dispersants may be present in an amount about 0.1 wt % to about 100 wt %, about 1 wt % to about 99 wt %, about 5 wt % to about 95 wt %, about 10 wt % to about 90 wt %, about 15 wt % to about 85 wt %, about 20 wt % to about 80 wt %, about 25 wt % to about 75 wt % of the total weight of the light-curable composition, or any individual value or sub-range within these ranges.

In some embodiments, the light-curable composition includes a photoinitiator. Photoinitiators can be light sensitive chemicals that decompose into free radicals, which begins a polymerization process. For example, photonitiators may absorb one or more wavelength of light (e.g., UV light, LED light, etc.) and convert it into energy needed to drive the polymerization process (i.e., curing). The specific combination and type of photoinitiators used can impact the properties of the resulting gel. For example, the more photoinitiator there is in a composition, the faster the composition cures. Nonetheless, if the amount of photoinitiator is too high, the photoinitiator can cause excessive exotherms that heat up the composition when applied to a client's nails. This is especially uncomfortable for a client whose nails have been damaged by excessive filing, drilling or harsh abrasives. In some embodiments, the adhesive section 118, the polish section 122 and the top coat section 126 (i.e., the gel coat) each contains a different amount and/or type of photoinitiator(s). For example, the top coat section 126 may include a larger amount of photoinitiator than the polish section 122 and the adhesive section 118. Similarly, the polish section 122 may include a larger amount of photoinitiator than the adhesive section 118, but less than the top coat section 126. The adhesive section 118 may contain the lowest amount of photoinitiator because it is the closest composition to the natural nail and excessive heating may be uncomfortable to a client. In some embodiments, the photoinitiator of one or more of the adhesive section 118, polish section 122 or top coat section 126 starts the polymerization process under UV light.

The photoinitiator may be present in an amount of about 0.1 wt % to about 50 wt % of the total weight of the light-curable composition, or any individual value or sub-range within this range. The photoinitiator may include at least one of diphenyl (2,4,6-trimethylbenzoyl) phosphine oxide, ethyl (2,4,6 trimethylbenzoyl) phenylphosphinate (TPO-L), phenyl bis (2,4,6-trimethylbenzoyl)-phosphine oxide (BAPO), 1-hydroxycyclohexyl phenyl ketone (HCPK), 2,2-dimethoxy-2-phenylacetophenone (BDK), 2,4,6-trimethylbenzimidyldiphenylphosphine oxide, 2,4,6-trimethylbenzimidylphenylphosphonic acid ethyl ester, isopropyl thioxanthone or camphorquinone. Any of the aforementioned photoinitiator components may be present in the light-curable composition individually in an amount of about 0.1 wt % to about 50 wt %, about 1 wt % to about 25 wt %, about 2 wt % to about 20 wt %, about 5 wt % to about 15 wt %, less than about 5 wt %, less than about 3 wt %, less than about 2 wt % of the total weight of the light-curable composition, or any individual value or sub-range within these ranges. In some embodiments, mixtures of any two or more of the aforementioned film forming components may be present in an amount of about 0.1 wt % to about 50 wt %, about 1 wt % to about 25 wt %, about 2 wt % to about 20 wt %, about 5 wt % to about 15 wt %, less than about 5 wt %, less than about 3 wt %, less than about 2 wt % of the total weight of the light-curable composition, or any individual value or sub-range within these ranges. In some embodiments, the adhesive section 118 contains about 0.1 wt % to about 40 wt % of at least one photoinitiator, the polish section 122 contains about 0.5 wt % to about 45 wt % of at least one photoinitiator and the top coat section 126 contains about 1.0 wt % to about 50 wt % of at least one photoinitiator.

In some embodiments, the light-curable composition contains a colorant. The colorant may be present in the light-curable composition in an amount of about 0.1 wt % to about 50 wt %, about 1 wt % to about 25 wt %, about 2 wt % to about 20 wt %, about 5 wt % to about 15 wt %, less than about 5 wt %, less than about 3 wt %, less than about 2 wt % of the total weight of the light-curable composition, or any individual value or sub-range within these ranges. In some embodiments, the colorant may include a pigment. The pigment may be in particulate form. In some embodiments, the colorant contains a dispersion of pigments (e.g. two, three or four pigments or dispersions thereof). The composition may include one or more colorant or a dispersion thereof. Suitable colorants include, but are not limited to, Organic Red D&C, D&C Red 6 Barium Lake, Black Iron Oxide, FD&C Blue 1 Aluminum Lake, Titanium Dioxide, FD&C Yellow 6 Aluminum Lake or combinations of any two or more of the foregoing.

In some embodiments, the adhesive section 118 in a cured state may have a hardness that is less than the hardness of the polish section 122 in a cured state, and the top coat section 126 in a cured state. In some embodiments, the polish section 122 in a cured state may have a hardness that is less than the hardness of the top coat section 126 in a cured state. The top coat section 126 in a cured state may have a hardness value that is greater than the hardness of either the adhesive section 118 in a cured state or the polish section 122 in a cured state, which may suitably protect the underlying natural nail, adhesive section 118 and/or polish section 122 beneath. In some embodiments, the adhesive section 118 in a cured state has a Rockwell hardness of about 1 gram(s) per cubic centimeter (g/cc) to about 100 g/cc or a Shore D hardness of about 10 to about 90. The polish section 122 in a cured state may have a Rockwell hardness of about 2 gram(s) per cubic centimeter (g/cc) to about 105 g/cc, and/or a Shore D hardness of about 15 to about 95. The top coat section 126 may have a Rockwell hardness of about 10 gram(s) per cubic centimeter (g/cc) to about 110 g/cc, and/or a Shore D hardness of about 20 to about 100.

According to some embodiments, the light-curable artificial nail has a thickness of about 0.5 mm to about 5.0 mm or about 0.3 mm to 2 mm. If formed of layers, each layer of a particular section may have a thickness of about 0.05 mm to 1 mm, in accordance with some embodiments. In some embodiments, the thickness of the body 102, a section, or a layer may be non-uniform, for example, may be greater near the cuticle and, for example, linearly decrease toward the tip of the light-curable artificial nail 100. In some embodiments, the body may be formed of about four (4) layers to about 20 layers, or about four (4) layers to about 10 layers, or about six (6) layers to about 10 layers (e.g., total for all sections). In some embodiments, body 102 of the light-curable artificial nail 100 may contain about 0.1 cubic centimeters ($cm^3$) to about 5.0 $cm^3$ of the light-curable composition in one or more sections or in the combined sections.

In some embodiments, the light-curable composition includes at least one component that is curable by one or more predetermined wavelengths of electromagnetic radiation. In some embodiments, the light-curable composition having the at least one curable component may be cured (or semi-cured) by ultraviolet (UV) radiation (e.g., wavelength between of 100 to 400 nanometers (nm)), visible radiation (e.g., wavelength between 400 to 780 nm), or combinations thereof. In some embodiments, the light-curable composition having the at least one curable component may be cured (or semi-cured) by only UV radiation or a subset of wavelength(s) of UV radiation (e.g., UVA, UVB, or UVC).

In some embodiments, the light-curable composition includes, but is not limited to, a polymer, a film forming agent, a plasticizer, an additive, a dispersant, a photoinitiator, silicone, silicon, keratin, an ethylenically unsaturated monomer, an oligomer, an unreactive solvent, a colorant or combinations thereof.

In some embodiments, the light-curable composition includes the colorant. Suitable colorants include, but are not limited to, carbon black, azo dye, quinophthalone dye, triphenylmethane dye, xanthene dye, iron oxide, iron hydroxide, titanium dioxide, sunset yellow dye, allura red dye, amaranth dye, koki neil red dye, azogeranin dye, tartrazine dye, brilliant black dye, canthaxanthin dye, patent blue dye, fast green dye, brilliant blue dye, acid green dye, erythrosine dye, quinoline yellow, indigotin, curcumin and/or combinations thereof. In some embodiments, the colorant may be homogenously mixed throughout the entire light-curable composition or if the light-curable composition is applied in layers, the colorant may be in only a top layer or top two or three layers of the light-curable composition. In some embodiments, the colorant may not be homogenously mixed throughout the entire light-curable composition. For example, the polish section 122 may include a colorant in one portion of the polish section 122 and include a different colorant in another portion of polish section 122.

In some embodiments, the polymer includes, but is not limited to, one or more of a polyurethane, a (meth)acrylic polymer, poly(methyl methacrylate), a copolymer, a vinyl polymer, a vinyl copolymer, a cellulose polymer, a styrene butadiene polymer or combinations thereof.

In some embodiments, the film-forming agent may include, but is not limited to, one or more of an epoxy resin, a (meth)acrylic resin, a styrene resin, an acrylate-styrene resin, a vinyl resin, a polyester, an alkyd resin, a cellulose ester, a resin resulting from condensation of formaldehyde with an arylsulphonamide or combinations thereof.

According to some embodiments, the plasticizer includes, but is not limited to, one or more of tributyl phosphate, tributyl phosphate, tributoxyethyl phosphate, tricresyl phosphate, triphenyl phosphate, glycerol triacetate, butyl stearate, butyl glycolate, benzyl benzoate, butyl acetyltricinoleate, glyceryl acetyltricinoleate, dibutyl phthalate, diisobutyl phthalate, dioctyl phthalate, dimethoxyethyl phthalate, diamyl phthalate, triethyl citrate, tributyl citrate, tributyl acetylcitrate, tri(2-ethylhexyl)acetylcitrate, dibutyl tartrate, camphor or combinations thereof.

In some embodiments, the additive may include, but is not limited to, one or more of silica, fumed silica, diatomaceous earth, bentonite clay, kaolinite, pyrophyllite, sericite, saponite, a smectic, a vermiculite, montmorillinite, beidillite, nontronite, hectorite, talc, mica, zirconium oxide, zinc oxide, magnesium oxide, saponite, calcium stearate, zinc stearate, aluminum stearate, stearalkonium, distearalkonium, an organic modified clay, a hydrogenated castor oil, a hydrogenated castor oil wax, an inorganically modified castor oil, an organically modified castor oil, a triglyceride, glyceryl tri-12-hydroxy stearate, a polyamide, a polyamide wax, 12-hydroxystearic acid diamide of ethylene diamine, 12-hydroxystearic acid diglycolamide, N-stearyl ricinoleamide, N-stearyl stearamide, a polyethylene oxide wax, a urea urethane, an acrylic resin, an amine salt of a polymeric polyester, salts of linear polyaminoamide and polymeric polyester, an amide solution of polycarboxylic acid, alkyl sultanate, alkylallyl sultanate, colloidal ester, polyester resin, phenol resin, melamine resin, epoxy resin, urethane resin, a polyimide resin, a polyester amide or combinations thereof.

In some embodiments, the dispersant may include, but is not limited to one or more of a non-surface active polymer, a surface-active component added to a gel or a surfactant.

In some embodiments, the light-curable artificial nail is free of any one or more of a pre-formed hard plastic, a primer, a basecoat, a nail polish, an acrylate polymer or copolymer, a methacrylate, an ethyl methacrylate, a butyl methacrylate, a cyanoacrylate, a urethane(meth) acrylate, a polymethyl methacrylate, a polymethyl methacrylate-polymethacrylic acid copolymer, a polypropylene glycol (meth) acrylated monomer, or a polyethylene glycol (meth) acrylated monomer. In certain embodiments, the light-curable artificial nail is free of a nail polish, for example, the light-curable artificial nail contains a colorant and appears painted, but is free of a nail polish.

According to some embodiments, the light-curable composition can include, but is not limited to one or more of a resin, a photoinitiator or a polymer. In some embodiments, the light-curable composition includes about 1 weight percentage (wt %) to about 50 wt % of the resin, about 1 wt % to about 50 wt % of the photoinitiator and about 1 wt % to about 90 wt % of the polymer based on the total weight of the light-curable composition. In some embodiments, the light-curable artificial nail is in a shape of a natural nail, an ovular nail, a rectangular nail, a pointed nail, or a rounded nail.

In some embodiments, an adhesive can be used to attach different sections together or various layers within a section together. In some embodiments, the adhesive includes, but is not limited to, a pressure-sensitive adhesive, a silicone-based pressure-sensitive adhesive, a rubber-based material, silicone rubber, a resin, a silicone resin, rosin, natural rubber, synthetic rubber, styrene-butadiene rubber, butyl rubber, polyisobutylene, styrene-isoprene-styrene block copolymer rubber, styrene-butadiene-styrene block copolymer rubber, recycled rubber, acrylic, acrylic ester copolymer, methacrylic ester copolymer, polyvinyl ether, polyurethane, polyester, ethylene vinyl adhesive, a polysaccharide, starch, glue or combinations thereof.

Kits for Light-Curable Artificial Nails

Figure 2A:
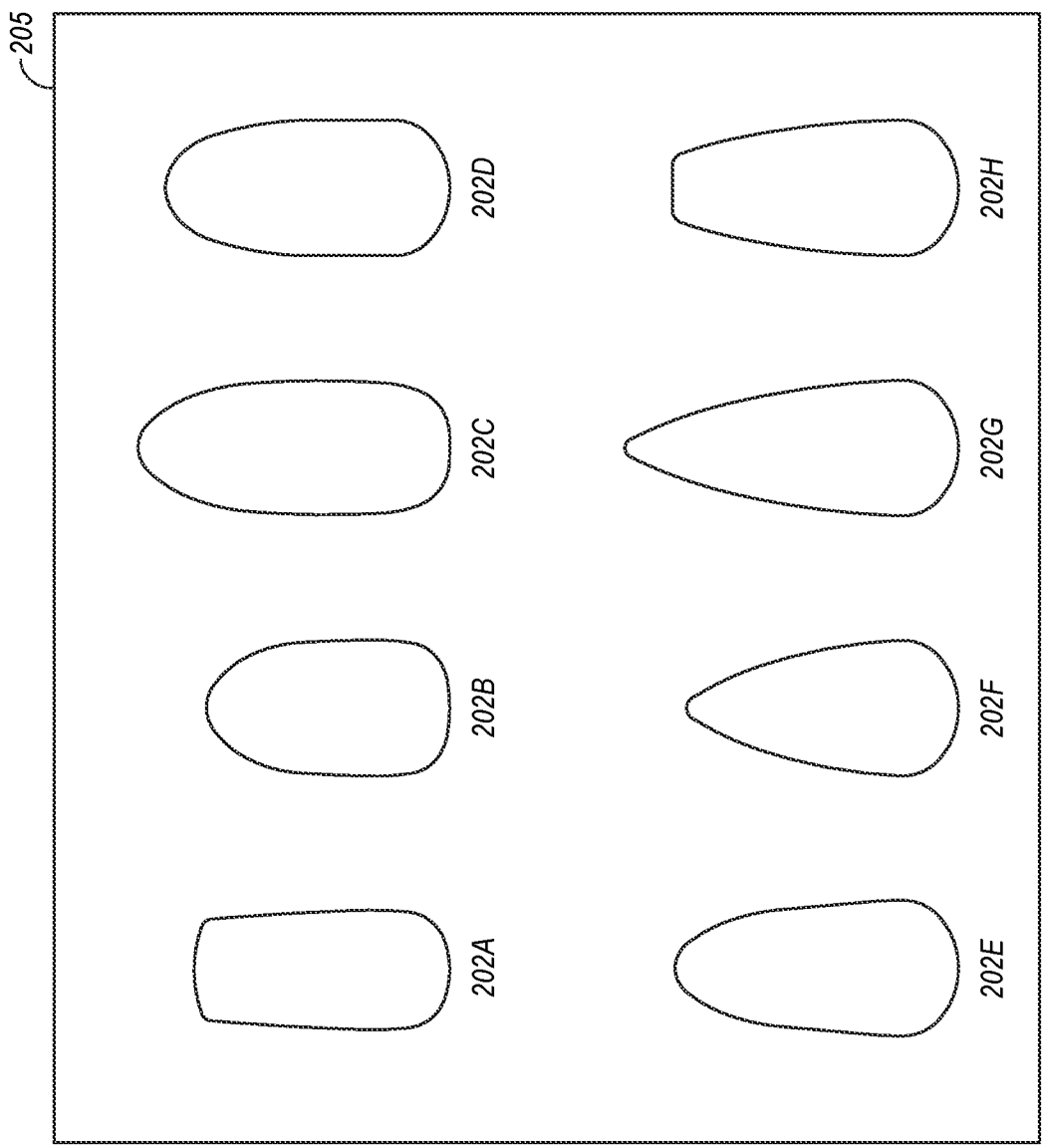
FIG. 2A illustrates a number of light-curable artificial nails adhered to a removable layer, in accordance with some embodiments.

According to further embodiments, described herein are kits containing one or more light-curable artificial nails according to embodiments herein. In some embodiments, the kit may further include a removable layer removably attached to and covering the adhesive section. For example, FIG. 2A illustrates a number of light-curable artificial nails 202A through 202H (collectively referred to as "light-curable artificial nail(s) 202" herein) that adhere to removable layer 205. The removable layer 205 may be a backing formed of any material, such as, a wax, a paper, a polymer material or combinations thereof. The adhesive layer of light-curable artificial nails 202 and the removable layer 205 may be configured such that the removable layer 205 easily peels away from the adhesive section and so that the adhesive material and the backing material do not chemically react.

In some embodiments, a removable layer may also be used to cover the top side of the light-curable artificial nail. The removable layer on the top side of the light-curable artificial nail may be opaque or at least opaque to the one or more wavelengths of light that can cure the light-curable artificial nail.

In some embodiments, one or more of the light-curable artificial nails 202 may include a body having a shape that at least in part corresponds to the shape of a natural nail as described herein. The light-curable artificial nails 202 can include various shapes and sizes. In some examples, the different sizes can correspond to the sizes of different figures such as a pinky finger, thumb, middle finger, etc. As illustrated in FIG. 2A, the light-curable artificial nails can include various shapes such as square (e.g., light-curable artificial nail 202A), oval short (e.g., light-curable artificial nail 202B), oval long (e.g., light-curable artificial nail 202C), rounded (e.g., light-curable artificial nail 202D), almond (e.g., light-curable artificial nail 202E), pointed (e.g., light-curable artificial nail 202F), extended pointed (e.g., stiletto) (e.g., light-curable artificial nail 202G), extended with square tip (e.g., coffin) (e.g., light-curable artificial nail 202H). The examples are provided for illustration, rather than limitation. In other embodiments, the light-curable artificial nail can be different shapes or the same shapes but long, short, or normal versions. The body of the light-curable artificial nails 202 includes a top surface opposing a bottom surface. In some embodiments, an adhesive section forms at least part of the bottom surface of the light-curable artificial nails 202. The one or more sections of the body of one or more of the light-curable artificial nails 202 may include or be formed from a light-curable composition configured in a semi-cured state.

Figure 2B:
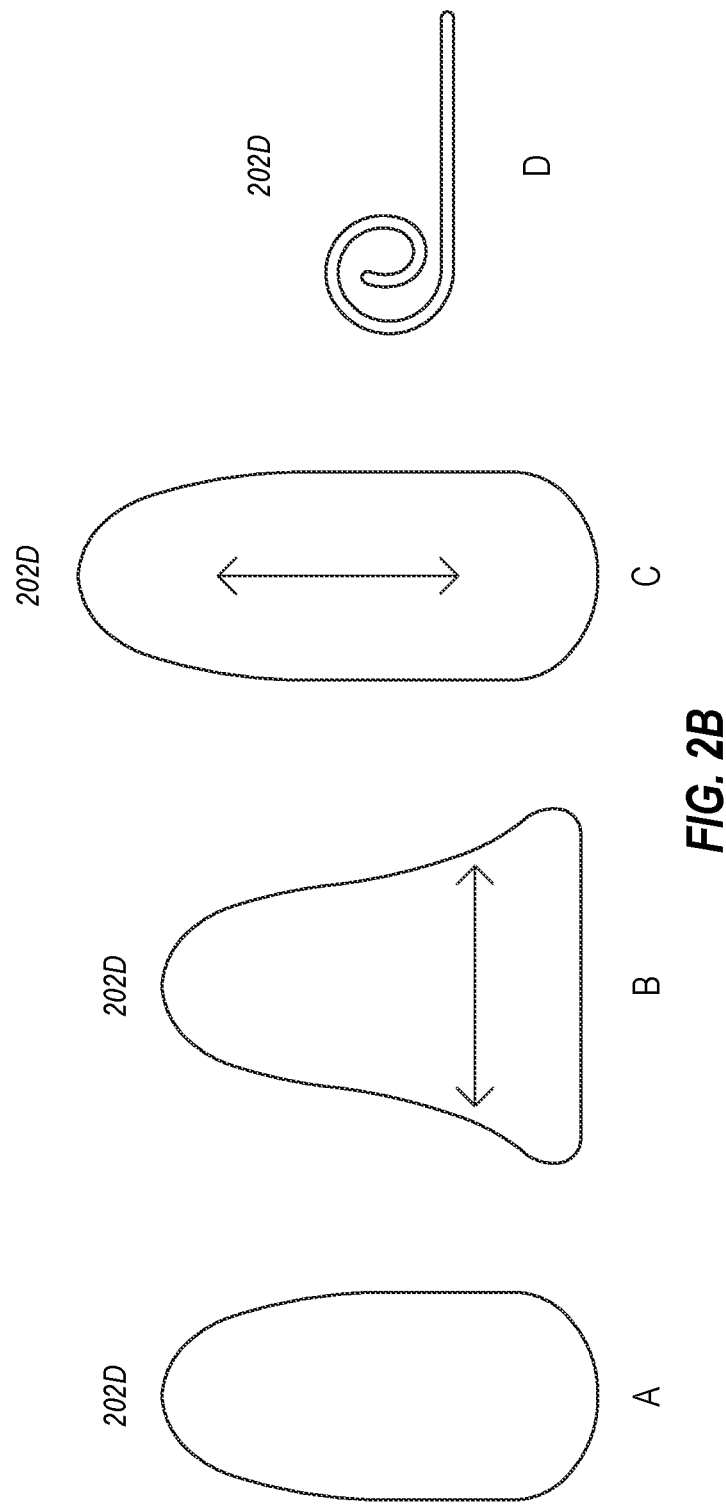
FIG. 2B illustrates the elasticity and flexibility of a light-curable artificial nail, in accordance with some embodiments.

The semi-cured state of the light-curable artificial nail may be flexible and/or elastic to facilitate conformance of a shape of the light-curable artificial nail to the shape of the natural nail. FIG. 2B illustrates the elasticity and flexibility of a light-curable artificial nail, in accordance with some embodiments. In FIG. 2B, light-curable artificial nail 202D is shown in positions A through D. In position A, light-curable artificial nail 202D is shown without any applied force and illustrates the shape of light-curable artificial nail 202D after removal from removable layer 205. In position B, light-curable artificial nail 202D is illustrated with an application of a lateral force that stretches light-curable artificial nail 202D in the lateral direction. In position C, light-curable artificial nail 202D is illustrated with an application of a vertical force that stretches the light-curable artificial nail 202D in the vertical direction. In some embodiments, stretching of the light-curable artificial nail 202D can cause one or more of an increase of surface area or a decrease in the thickness of the light-curable artificial nail 202D. In some embodiments, the light-curable artificial nail 202D can be stretched in any direction within a 360 degree radius. In position D, light-curable artificial nail 202D is curved under itself illustrating the flexibility of the light-curable artificial nail 202D.

Figure 3A:
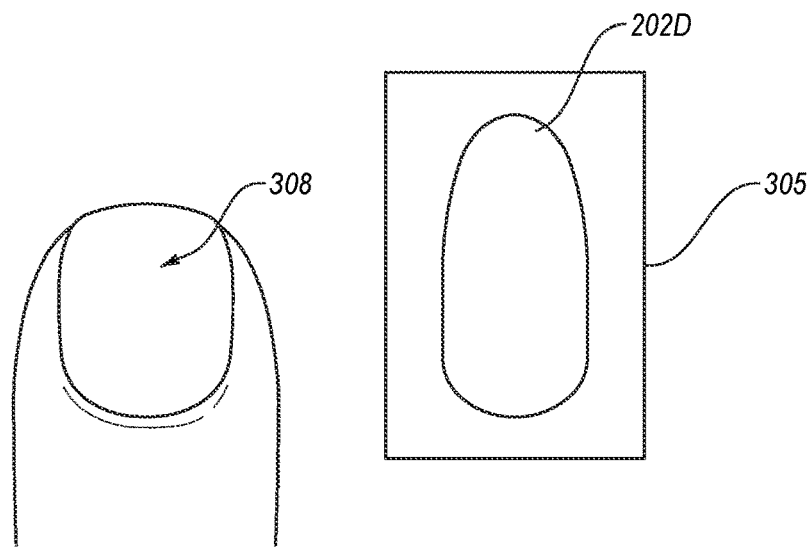
FIG. 3A illustrates a step of arranging of a light-curable artificial nail on a natural nail, in accordance with some embodiments.
Figure 3B:
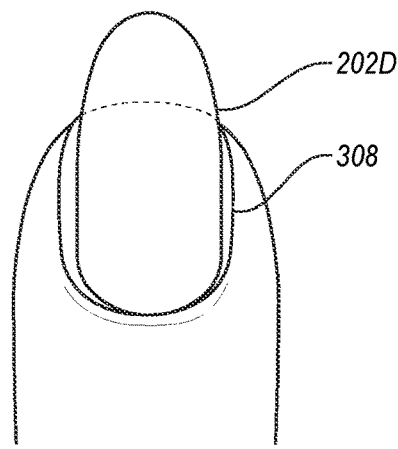
FIG. 3B illustrates another step of arranging of a light-curable artificial nail on a natural nail, in accordance with some embodiments.
Figure 3C:
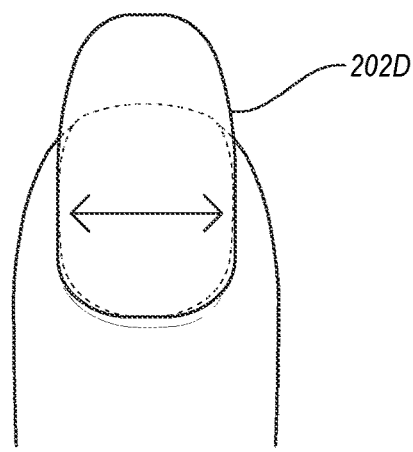
FIG. 3C illustrates another step of arranging of a light-curable artificial nail on a natural nail, in accordance with some embodiments.

FIGS. 3A-3C illustrate steps of arranging of a light-curable artificial nail on a natural nail according to some embodiments. In FIG. 3A, light-curable artificial nail 202D is adhered to removable layer 305. Also illustrated is a natural nail 308. In FIG. 3B, light-curable artificial nail 202D is removed from the removable layer 305 and position above natural nail 308. After removal of the removable layer 305, the adhesive section remains on the bottom surface of the light-curable artificial nail 202D and the adhesive section of the light-curable artificial nail 202D may be positioned on a user's natural nail. As illustrated and in some embodiments, the light-curable artificial nail 202D is not the exact shape of the user's natural nail 308. As illustrated, the width of the light-curable artificial nail 202D is less than the width of the natural nail 308.

As illustrated in FIG. 3C, the light-curable artificial nail 202D is arranged on the natural nail 308 by stretching the light-curable artificial nail 202D to cover the surface of the natural nail. The width, as illustrated, of the light-curable artificial nail 202D in increased so that the light-curable artificial nail 202D covers the entire surface of the underlying natural nail 308. The adhesive section on the bottom surface of the light-curable artificial nail 202D adheres to the top surface of the natural nail 308 (without the user applying an adhesive coating to the natural nail or the light-curable artificial nail 202D). In some embodiments, a force can be applied so that the light-curable artificial nail 202D is pressed down and sufficiently adheres the light-curable artificial nail to the natural nail. In some embodiments, the arranging of the light-curable artificial nail 202D can be a single step, which can be similar to the application of a conventional press-on nail.

In some embodiments, the light-curable artificial nail 202D can be similar to the shape of the natural nail 308. The light-curable artificial nail 202D in not stretched. In some embodiments, the light-curable artificial nail 202D can be flexed so conform to the curvature of the natural nail 308.

Figure 4A:
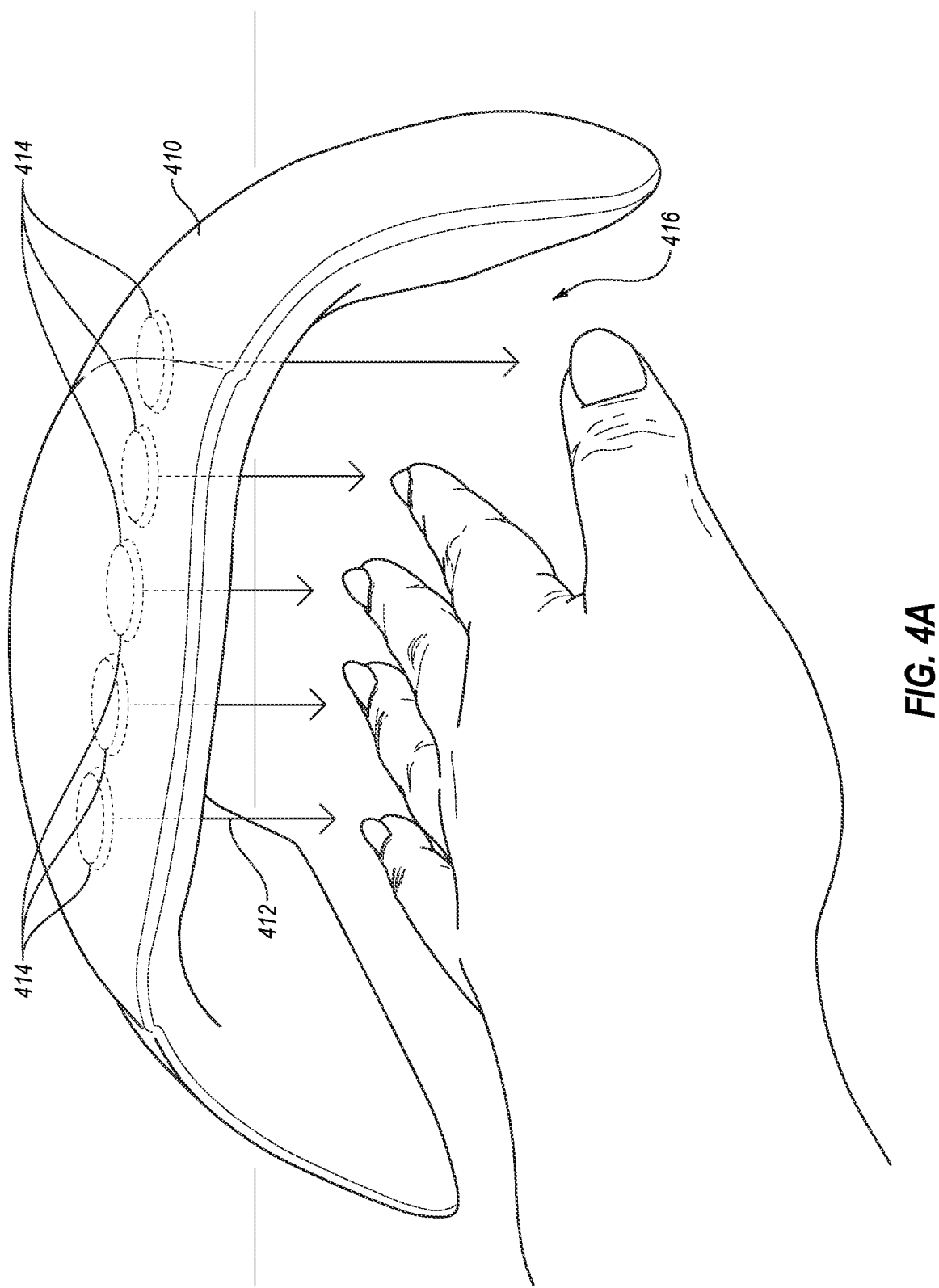
FIG. 4A illustrates a light emitting device to cure the semi-cured light-curable artificial nails, in accordance with some embodiments.
Figure 4B:
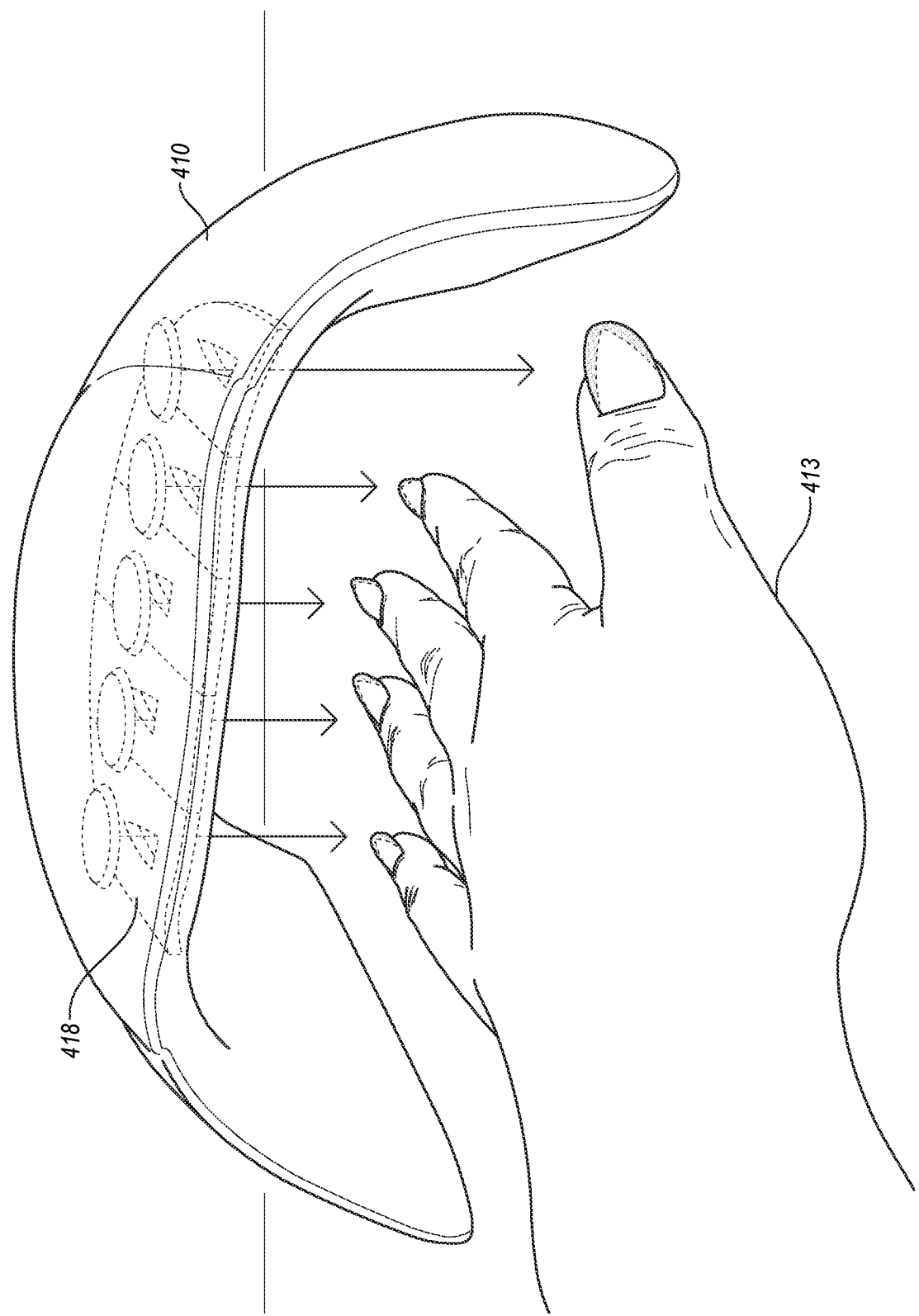
FIG. 4B illustrates a light emitting device to cure the semi-cured light-curable artificial nails, in accordance with some embodiments.
Figure 4C:
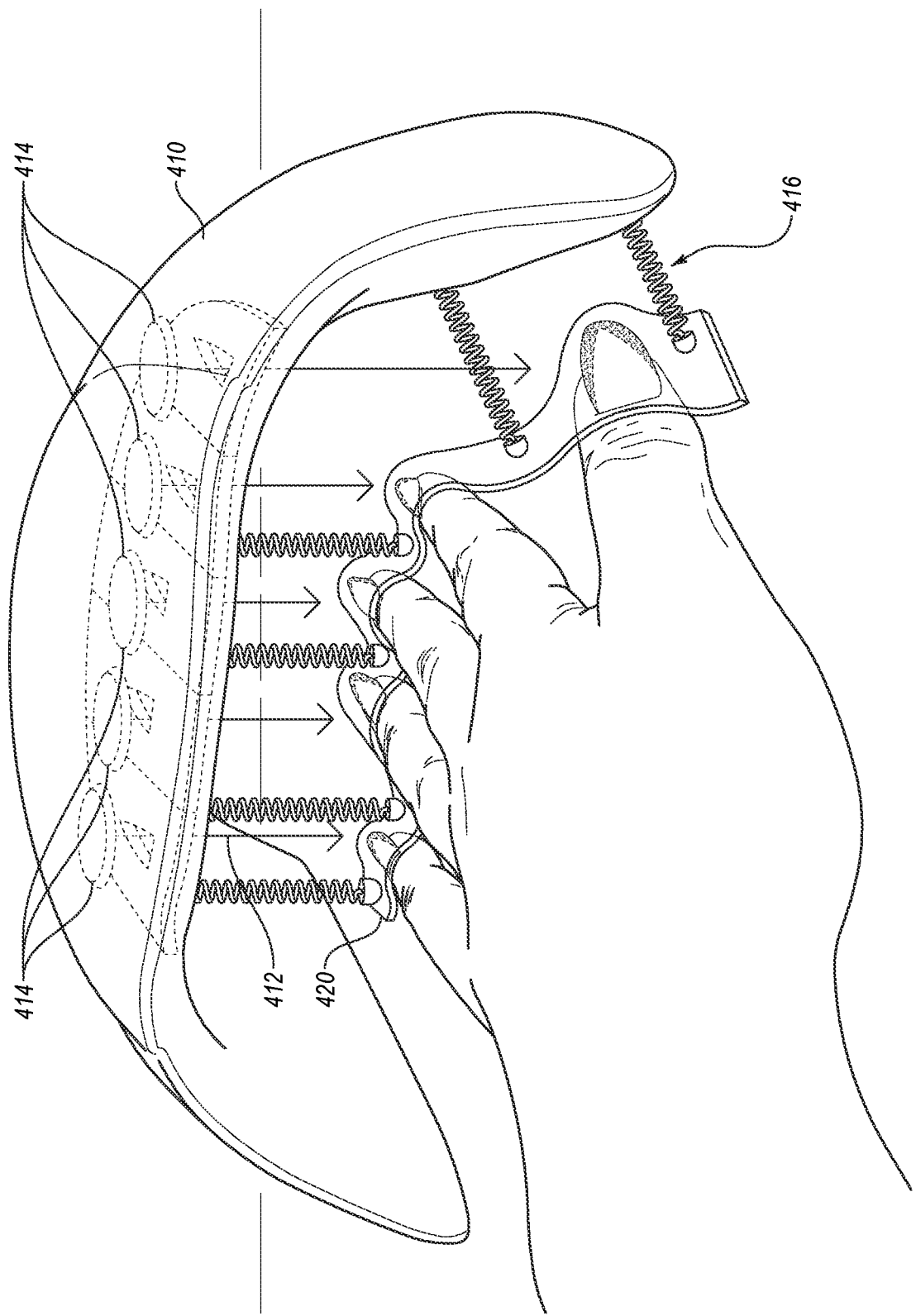
FIG. 4C illustrates a light emitting device with a pressure member, in accordance with some embodiments.

In some embodiments, subsequent to arranging the light-curable artificial nail 202D on the natural nail, the light-curable artificial nail 202D can be bonded to the natural nail using one or more of light curing and/or concurrent pressure as described with respect to FIGS. 4A-4C.

FIG. 4A-4C illustrate a light emitting device to cure the semi-cured light-curable artificial nails, in accordance with some embodiments. In some embodiments, kits as described herein may further include a light emitting device 410 for curing the light-curable artificial nails containing the light-curable composition (e.g., cure from a semi-cured state to a cured state). The light emitting device 410 may be configured to emit one or more wavelengths of electromagnetic radiation 412, such as UV radiation or visible light radiation. As illustrated, light emitting device 410 includes one or more light sources 414 that emit electromagnetic radiation at a specified wavelength. In some embodiments, the light emitting device 410 may be configured to emit light (e.g., electromagnetic radiation 412) at one or more wavelengths between 100 nm to 780 nm inclusive. According to some embodiments, the light emitting device includes one or more light emitting diodes (LED) that are used as light sources 414. In some embodiments, the light emitting device 410 may be small and compact having a maximum dimension of about 1 inches (in) to about 8 in or about 5 inches to about 12 inches. For example, the light emitting device 410 may have a cube-shaped housing such that the longest side is not greater than about 6 in. In some embodiments, the LED is configured to emit electromagnetic radiation 412 at one or more specified wavelengths of light that cure the light-curable composition(s) of the light-curable artificial nail. In some embodiments, the light emitting device 410 may have one or more LED light sources within a housing having dimensions of about 3 in to about 4 in. In some embodiments, the light emitting device 410 may be configured to automatically activate the light source when a finger is placed within a receiving cavity 416. In some embodiments, at least part of the housing of the light emitting device 410 is clear and transparent. In some embodiments, one or more mirrors may also be positioned within the receiving cavity 416 or housing to reflect light onto the light-curable artificial nails.

As illustrated in FIG. 4B, the stencils, such as stencil 418, are built into (or build to be inserted into and removed) the light emitting device 410 and can be changed either manually by rotation and/or by selecting a design on a user interface. The stencil 418 can cause the light emitting device 410 to be emit light in a pattern. As illustrated, the stencil 418 causes the emitted light to illuminate in a pattern. The patterned light allows the light-curable artificial nail to be cured in the a pattern where the cured portion of the light-curable artificial nail (e.g., light-curable composition) hardens and the non-cured portion remains unhardened and can be removed with relative ease leaving the desired pattern or shape. As illustrated, the darkened portion of the light-curable artificial nail is not exposed to light, while the non-darkened portion of the light-curable artificial nail is exposed to light based on the pattern of the stencil 418.

In some embodiments, a stencil can be separated such that each finger has a separate stencil or sub-stencil. In some embodiments, the emitted light can be focused to increase or decrease the size of the pattern that is projected onto the underlying light-curable artificial nails. For example, a stencil can be adjusted upwards towards the light source or downward away from the light source (e.g., moved in a vertical direction) to increase the size of the projected pattern or decrease the size of the projected pattern, respectively. In some embodiments, each stencil corresponding to an individual nail can be focused independently.

In some embodiments, the light emitting device 410 may have housings of any other shape known (e.g., spherical, ovular, pyramidal, etc.) such that the longest dimension is not greater than about 15 in, or not greater than about 12 in, or not greater than about 10 in, or not greater than about 8 in, or not greater than about 6 in. In some embodiments, the light emitting device 410 including all components and the housing may weigh not more than 10 pounds (lbs), or not more than 8 lbs, or not more than 5 lbs, or not more than 1 lb. The light emitting device 410 may be configured to receive at least a portion of at least one finger (or toe) having a light-curable artificial nail according to embodiments herein attached to the natural nail.

As illustrated in FIG. 4C, the pressure members, such as pressure member 420, are located outside the housing of the light emitting device 410. The pressure member 420 is configured to put pressure on the top side of the light-curable artificial nails (e.g., press the light-curable artificial nails onto the natural nails). In some embodiments, the pressure member 420 is transparent. The combination of a light sources 414 emitting the predetermined wavelength(s) of light to cure (e.g., from semi-cured state to cured state) the light-curable artificial nails, and in particular the adhesive sections of the light-curable artificial nail, and concurrent pressure can produce an enhanced bond quality between the light-curable artificial nail(s) and the natural nails. In some embodiments, the pressure member 420 can include or be integrated with one or more stencils such that the pressure member can apply pressure to the light-curable artificial nails and direct light to the light-curable artificial nail in a particular pattern. In other embodiments, the pressure member 420 and stencil are separate elements.

In some embodiments, the pressure member 420 can be formed of a flexible material such as silicone, soft plastic, and/or rubber. The flexible material can be configured to conform to the shape of the light-curable artificial nails (as applied to the user's natural nails).

In some embodiments, the pressure member 420 can be include a spring member that forces the pressure member downwards and allows pressure to be applied to the underlying light-curable artificial nails.

FIGS. 5A-5D illustrate various stencils that can be used to shape, pattern or apply pressure to light-curable artificial nails, in accordance with some embodiments. The following stencils allow the light-curable artificial nails, as described herein, to be patterned, shaped, and/or can be used to apply pressure to the light-curable artificial nails during the curing process. For purposes of illustration, rather than limitation, the patterns are shown in a particular shape. In other embodiments, the pattern can be of any shape.

In some embodiments, kits as described herein may further include at least one stencil. In some embodiments, the at least one stencil can include an opening in a desired shape and a solid portion surrounding the opening. In some embodiments, the stencil is configured to overlay at least a portion of the semi-cured light-curable artificial nail and to permit light to traverse (e.g., pass at least one wavelength of electromagnetic radiation through) the opening to the underlying light-curable artificial nail and block light (e.g., at least one wavelength of electromagnetic radiation) through the solid portion.

In some embodiments, the stencil(s) can be designed to apply pressure to a top side of the light-curable artificial nail when the light-curable artificial nail is arranged on a natural nail. For example, the stencil may have a curved shape such that the stencil can apply pressure to the entire top side of the light-curable artificial nail. In some embodiments, the opening of the stencil may be formed of a transparent solid material, such as a transparent plastic material. The solid portion that block light can be formed of an opaque solid material, such as an opaque plastic material.

In some embodiments, the stencil may be formed of any suitable material. In some embodiments, the stencil is formed of one or more of a plastic, glass, plexiglass, fabric, rubber (e.g., latex), adhesive and/or combinations thereof. In some embodiments, the stencil can be formed of a flexible material such as silicone, soft plastic, and/or rubber. The flexible material can be configured to conform to the shape of the light-curable artificial nail when the light-curable artificial nail is arranged on the natural nail.

In some embodiments, the stencil may include more than one shaped-opening. In some embodiments, the one or more openings may have a shape including, but not limited to, a natural nail, square tip, oval tip, round tip, square with round edges, pointed tip, V-shaped tip, claw-shaped, trapezoidal (e.g., from cuticle to tip), triangular (e.g., from cuticle to tip) and/or any geometric shape (e.g., a star, a diamond, a square, a rectangle, a circle, etc.). According to various embodiments, any portion of the semi-cured light-curable artificial nail that is not exposed to light will not become fully cured. As such, semi-cured portions that remain after completely curing and other portions of the light-curable artificial nail (e.g., based on the application of the stencil) can be removed and or peeled away, leaving only the fully cured portions of the nail that were exposed to light via the opening in the stencil.

Figure 5A:
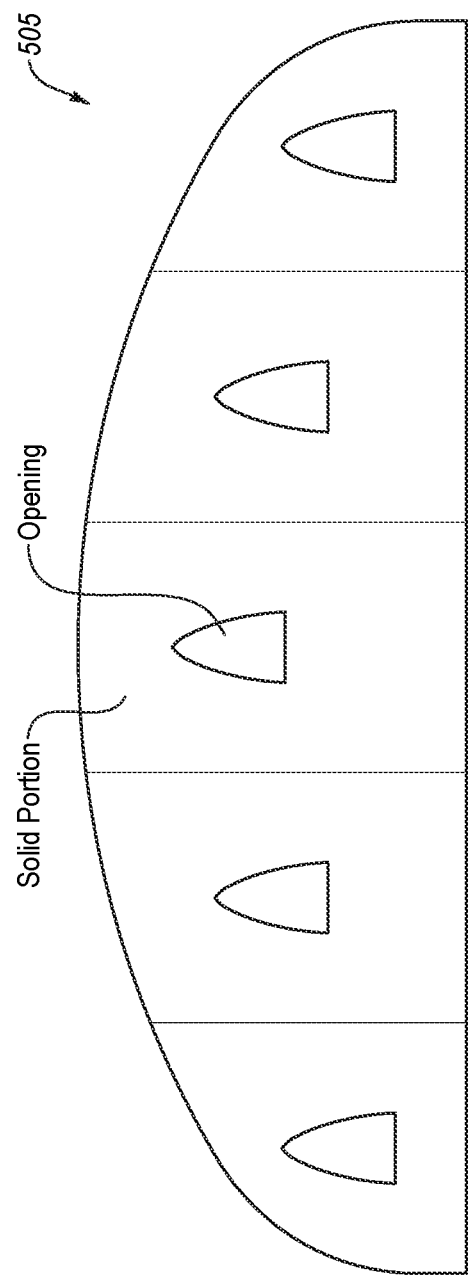
FIG. 5A illustrate a type of stencil, in accordance with some embodiments.

FIG. 5A illustrates a type of stencil that can be used to shape, pattern, and/or apply pressure to a light-curable artificial nail, in accordance with some embodiments. Stencil 505 can include one or more openings and one or more solid portions. Stencil 505 can be inserted into a light emitting device, such as light emitting device 410, so that the light emitting device can emit light in a particular pattern. Stencil 505 can be similar to stencil 418 as described with respect to FIG. 4B. According to some embodiments, the at least one stencil 505 may be removably attached to the light emitting device. For example, the stencil may be a material (e.g., a glass plate, a flexible plastic sheet, etc.) configured to slide into a receiving feature (e.g., a track, a pair of tracks, a slot, a pair of slots, etc.) in the light emitting device.

In some embodiments, the stencil 505 can be configured as a pressure member, such as pressure member 420 of FIG. 4C. As such, the stencil 505 can block electromagnetic radiation at the solid portion, allow the electromagnetic radiation to pass at the opening, and apply pressure to the top sides of one or more light-curable artificial nails. It can be noted that in some embodiments, the stencils as described herein can expose the entire light-curable artificial nail through the opening of stencil. The stencil can function (e.g., primarily) as a pressure member, and in some cases protect the user's hand (e.g., skin) from exposure to the electromagnetic radiation.

Figure 5B:
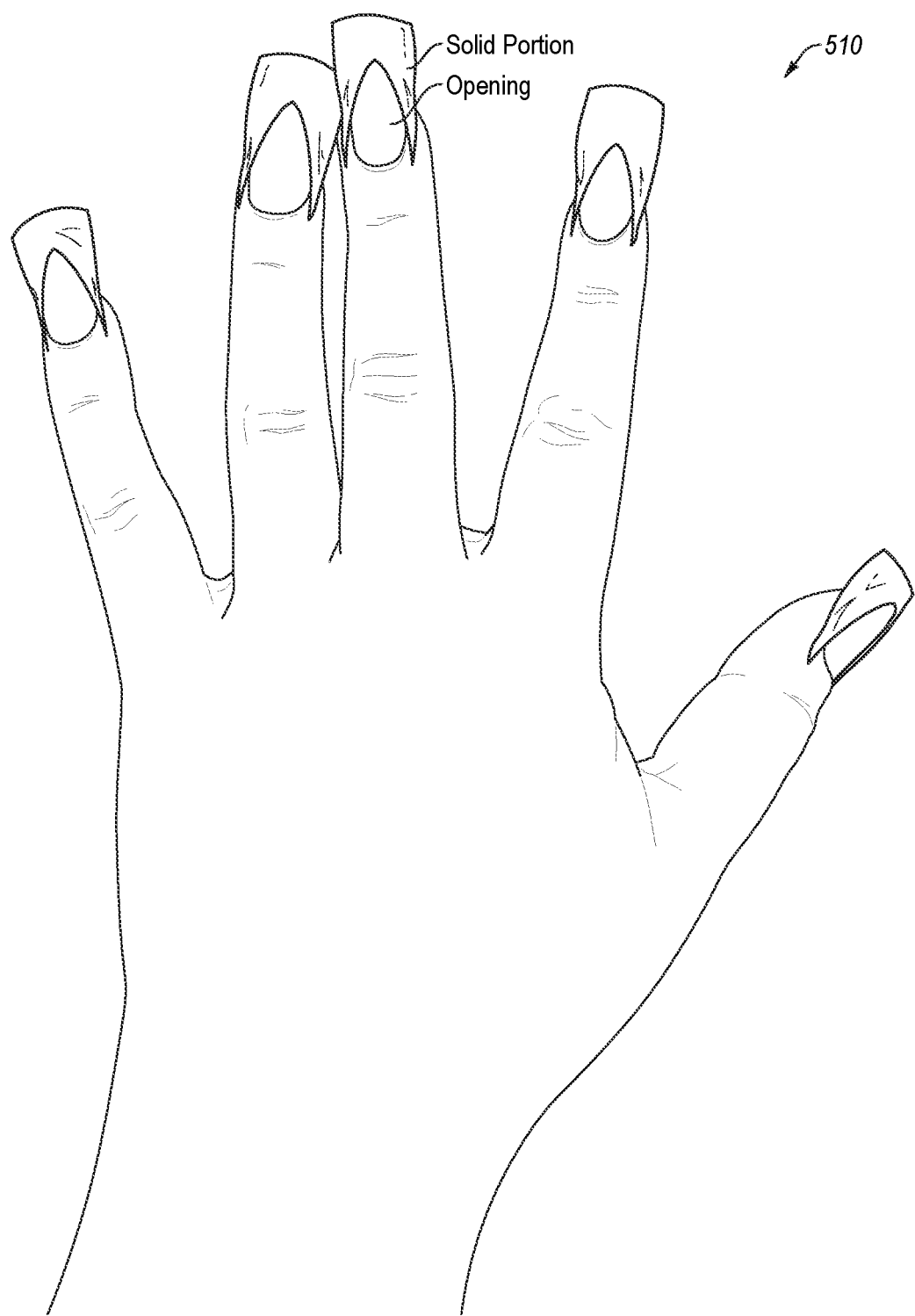
FIG. 5B illustrate another type of stencil, in accordance with some embodiments.

FIG. 5B illustrates another type of stencil that can be used to shape, pattern and/or apply pressure to a light-curable artificial nail, in accordance with some embodiments. In some embodiments, the stencil(s) 510 may be an opaque material with adhesive on a surface (e.g., opaque sticker) having an opening (e.g., no material, or clear material) in a desired shape. The sticker may be configured for placement over at least a portion of the fingertip (or toe tip) and to removably adhere to the finger (or toe) and light-curable artificial nail. Stencil(s) 510 is illustrated on light-curable artificial nail 202D. Solid portions of the opaque sticker surrounding the opening may be configured to block or substantially block light from the light emitting device. In some embodiments, to apply pressure to the light-curable artificial nail, the sides of the stencil(s) 510 can wrap around and adhere to at least part of the sides of the finger.

Figure 5C:
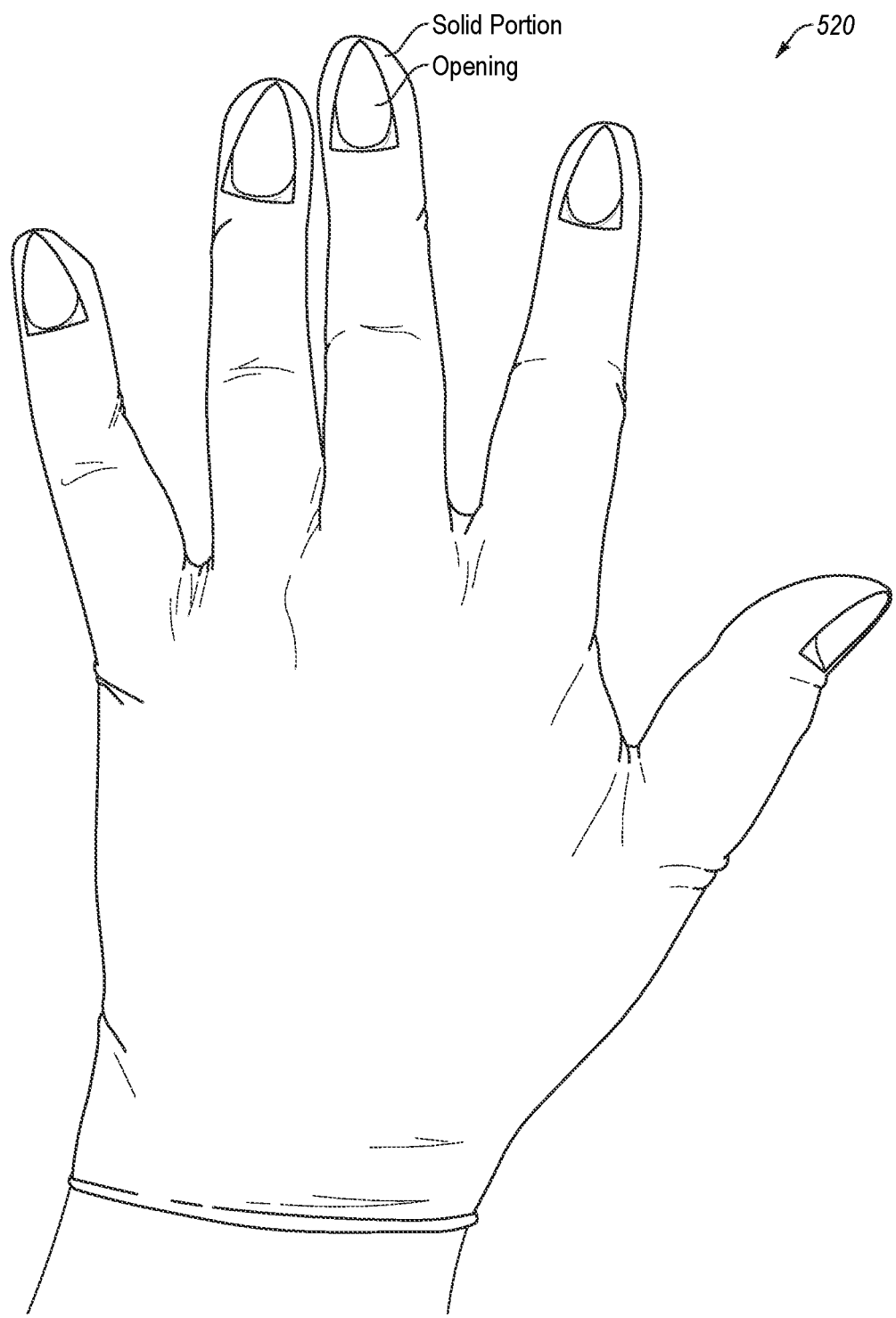
FIG. 5C illustrate another type of stencil, in accordance with some embodiments.

FIG. 5C illustrates another type of stencil that can be used to shape, pattern and/or apply pressure to a light-curable artificial nail, in accordance with some embodiments. In some embodiments, the stencil 520 may be in the form of a glove having openings proximate the fingertip(s) (or toe tip(s)) in a desired shape as described herein. In some embodiments, the openings of stencil 520 can include a transparent solid material. The gloves, and in particular the tips of the fingers of the gloves, can apply pressure to the top side of the light-curable artificial nail(s). The glove can include of any suitable material that blocks or substantially blocks one or more desired wavelengths of light.

Figure 5D:
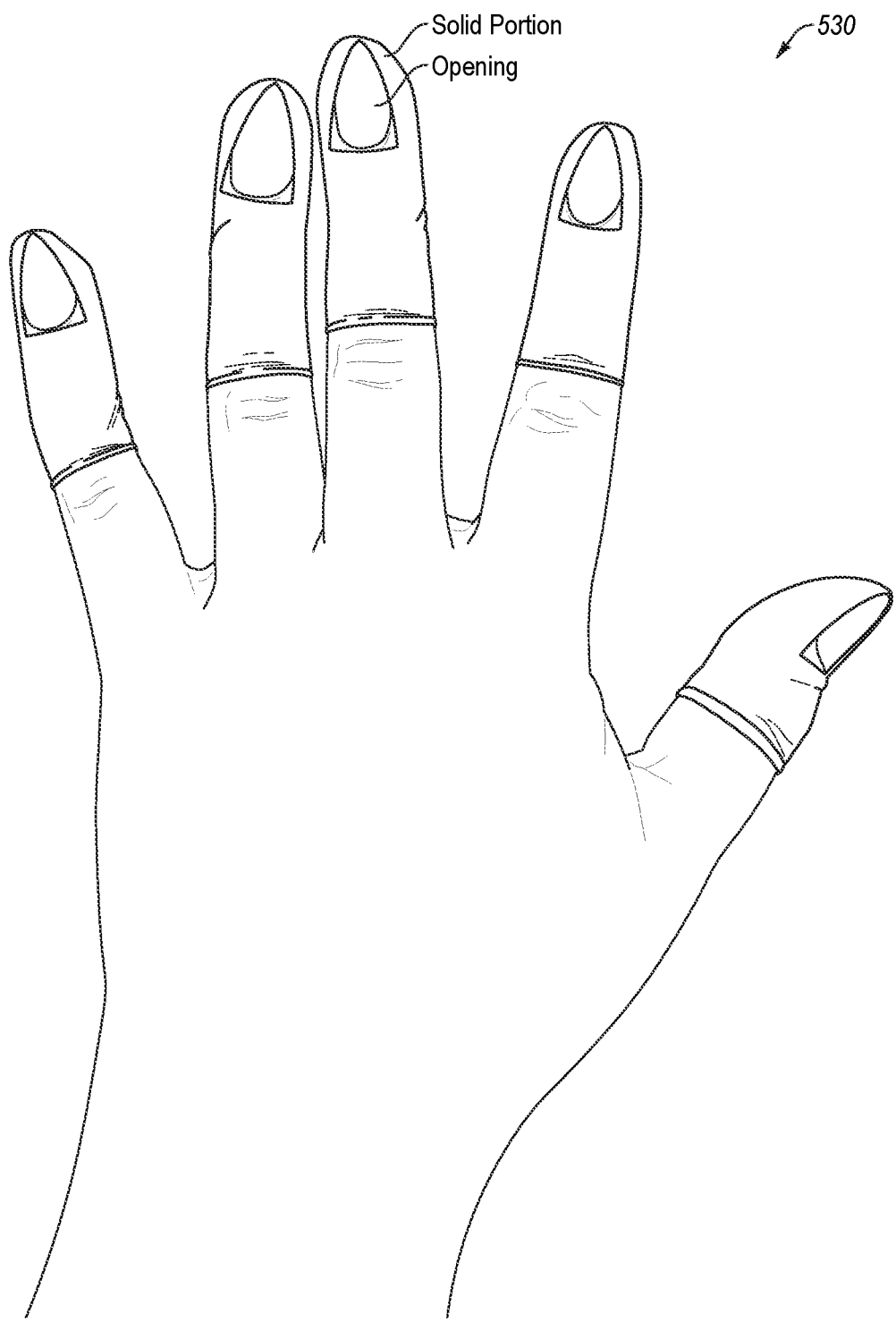
FIG. 5D illustrate another type of stencil, in accordance with some embodiments.

FIG. 5D illustrates another type of stencil that can be used to shape, pattern and/or apply pressure to a light-curable artificial nail, in accordance with some embodiments. In some embodiments, the stencil 530 may be a fingerette having an opening proximate the fingertip in a desired shape. In some embodiment, a fingerette can be applied to a single finger. In some embodiments, the opening of the stencil(s) 530 may be formed of a solid transparent material. In some embodiments, the stencil(s) 530 can be used to apply pressure to the top side of the underlying light-curable artificial nail, as described herein.

Figure 5E:
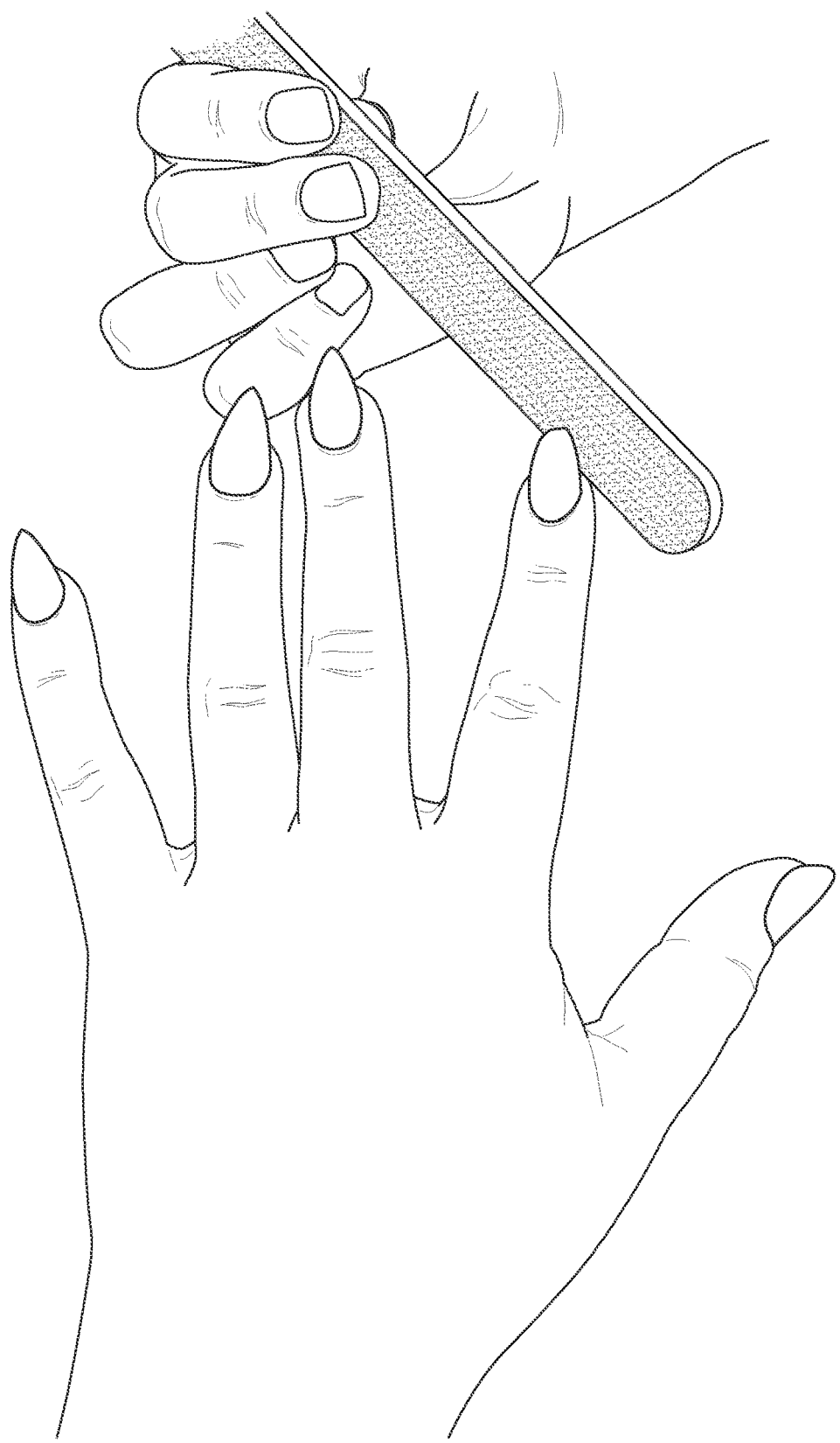
FIG. 5E illustrates removal of semi-cured portion of the light-curable artificial nail after curing using stencils, in accordance with some embodiments.

FIG. 5E illustrates removal of semi-cured portion of the light-curable artificial nail after curing using stencils, in accordance with some embodiments. FIG. 5E shows a user using a tool, such as file to remove a portion of the light-curable artificial nail that remains semi-cured after curing another portion of the light-curable artificial nail using a stencil. As noted above, a stencil allows a portion of the emitted light of the light emitting device to be blocked from contacting a first portion of the light-curable artificial nail. The first portion of the light-curable artificial nail remains semi-cured. The stencil also allows a portion of the emitted light to contact a second portion of the light-curable.

The second portion of the light-curable artificial nail is cured to a cured state. Since the first portion of the light-curable artificial nail in a semi-cured state is softer than the second portion of the light-curable artificial nail in the cured state, the first portion of the light-curable artificial nail is easier to remove than the second portion (e.g., less force needs to be applied). As illustrated, the first portion of the light-curable artificial nail is removed using a file leaving the second portion of the light-curable artificial nail, which is in the desired pattern.

Methods of Preparing Light-Curable Artificial Nails

The methods 600 and 650 can be performed using one or more pieces of manufacturing equipment, an operator, or combination thereof (e.g., collectively or individually referred to as "equipment" herein). The operations of method 600 and 650 are described as performed serially for purposes of illustration, rather than limitation. In some embodiments, the operations can be performed in parallel. In some embodiments, the same, different, greater, or fewer operations can be performed. In some embodiments, the operations can be performed in the same or different order.

Figure 6A:
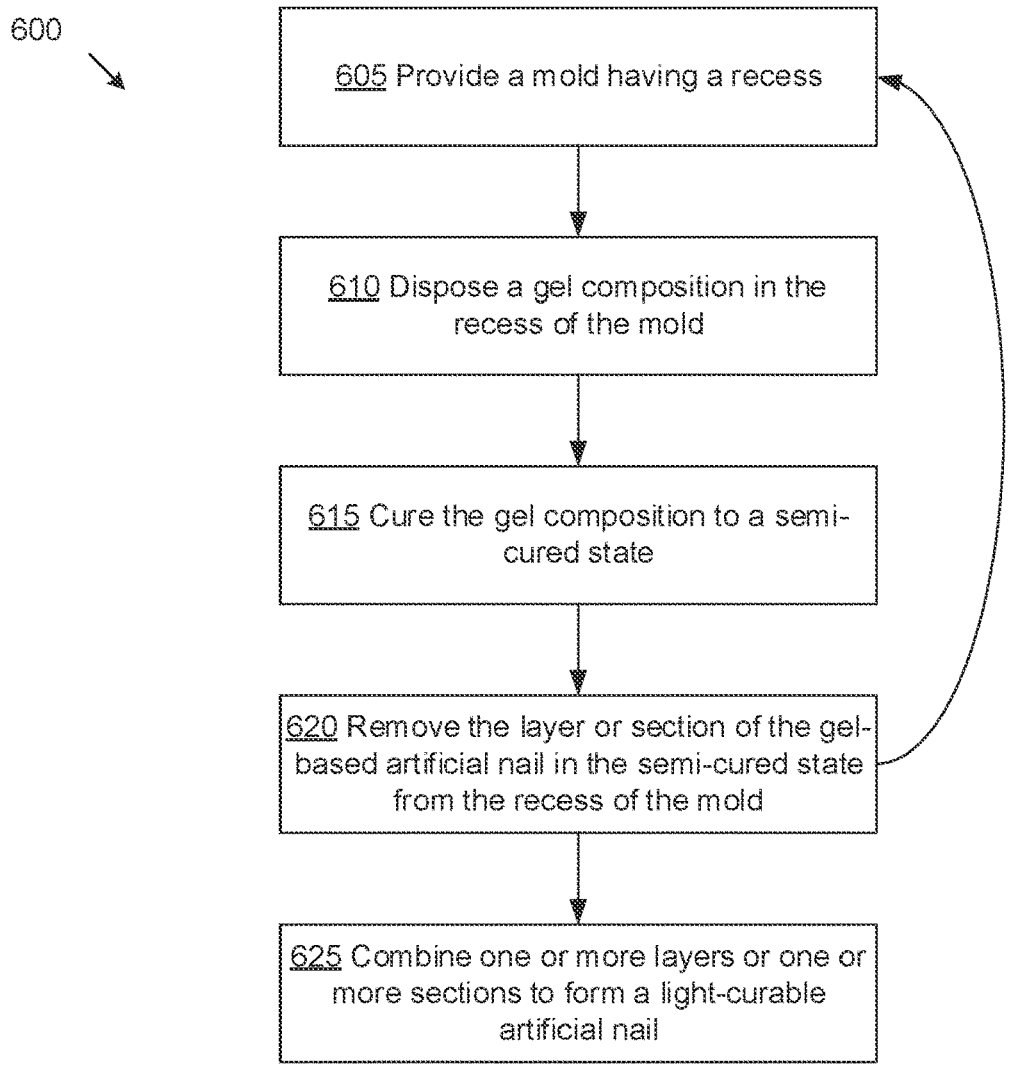
FIG. 6A illustrates a method of preparing light-curable artificial nails, in accordance with some embodiments.

FIG. 6A illustrates a method of preparing light-curable artificial nails, in accordance with some embodiments.

According to some embodiments, operation 605 of method 600 provides a mold having a recess. The recess can include a shape that at least in part corresponds to the shape of a natural nail. In some embodiments, the recess can be any desired shape and corresponds to the shape of the light-curable artificial nail.

At operation 610, the equipment disposes a light-curable composition in the recess of a mold. In some embodiments, the light-curable composition is disposed in a non-cured state. In some embodiments, disposing the light-curable composition includes an injection molding operation that injects the gel-composition into a mold. In other embodiments, the disposing the light-curable composition includes supplying the gel-composition near or in the recess of the mold and using a flat surface, such an edge of squeegee blade to move an amount of the light-curable composition in the recess, if applicable, and remove excess light-curable composition from the recess of the mold.

In some embodiments, one or more of a coating(s), a decoration(s), colorant(s) or other material may be placed in the recess before or after adding the light-curable composition and/or may be placed on top of the light-curable composition received in the recess. For example, if the shape of the recess is in the shape of a nail, a decoration in the form of a cuticle may be placed on top of the light-curable composition at the base of the nail. In another example, rhinestones, glitter or other decorative materials may be placed on the light-curable composition or pushed into the light-curable composition.

At operation 615, the equipment cures the light-curable composition from an uncured state to a semi-cured state. The light-curable composition is cured to form at least part of a body of the light-curable artificial nail. For example, the light-curable composition while in the mold may be exposed to one or more wavelengths of electromagnetic radiation for a time period sufficient to cure the material from a non-cured state to a semi-cured state. In some embodiments, the time period may be about 5 sec to about 15 min, or about 30 sec to about 10 min, or about 60 sec to about 5 min, or about 5 sec to about 5 min to form the semi-cured state. In the semi-cured state, the light-curable artificial nail may be elastic, semi-solid, formable, clay-like and/or stretchable to facilitate conformance of a shape of the light-curable artificial nail to the shape of the natural nail. The light-curable composition is configured to transition from the semi-cured state to a cured state upon exposure to one or more wavelengths of electromagnetic radiation. In some embodiments where multiple sections or layers are used to form the light-curable artificial nail, the operations can be repeated for one or more of the multiple sections and/or layers, as described below.

At operation 620, the at least part of the body of the light-curable artificial nail in the semi-cured state is removed from the recess of the mold.

In some embodiments, operations 605 through 620 (represented by the arrow from operation 620 to operation 605) can be repeated to form one or more layers and/or sections of the light-curable artificial nail. In some embodiments, the same mold or a different mold can be used. In some embodiments, the same light-curable composition or a different light-curable composition can be used.

At operation 625, the one or more layers and/or sections can be combined to form the body of the light-curable artificial nail. In some embodiments, the one or more layers can be sufficiently sticky such that the layers can be combined with an application of pressure. In some embodiments, the combined layers can further cured from a first semi-cured state to a second semi-cured state that is more cured than the first semi-cured state. The additional curing can help bond the various layers and/or sections together. In some embodiments, the application of pressure can be used concurrently with light curing to bond the various layers and/or sections together. In some embodiments, additional materials, such as adhesives can be disposed between the various layers and/or sections to help combine and/or bond the various layers and/or sections together.

In other embodiments, a method of forming a light-curable artificial nail may include disposing one or more layers or one or more sections of a light-curable composition as described herein in a recess of a mold. In some embodiments, one or more layers or one or more sections may be allowed to set (e.g., if not a non-light-curable composition) or may be semi-cured (e.g., for a period of about 1 sec to about 20 sec) before the next layer is disposed on top of the previous layer. In some embodiments, each layer may have a thickness of about 0.05 mm to about 1 mm. In some embodiments, the resulting thickness of the light-curable artificial nail may be about 0.5 mm to about 5.0 mm. As in the previous method, in some embodiments, one or more of a coating(s), a decoration(s), colorant(s) or other decorative material may be placed in the recess before or after adding a layer or section of material, such as a layer of light-curable composition.

According to some embodiments, the equipment can further prepare the light-curable composition. In some embodiments, the light-curable composition is prepared prior to disposing the light-curable composition in the recess of the mold. The light-curable composition may be prepared by combining one or more components including, but not limited to, a polymer, a film forming agent, a plasticizer, an additive, a dispersant, a photoinitiator, silicone, silicon, keratin, an ethylenically unsaturated monomer, an oligomer, an unreactive solvent, a colorant and/or combinations thereof as described herein.

In some embodiments, preparing the light-curable composition includes combining about 1 wt % to about 50 wt % of a resin with about 1 wt % to about 50 wt % of a photoinitiator and about 1 wt % to about 90 wt % of a polymer to form a combination. Combining the components may further include mixing the combination for about 5 sec to about 5 minutes and/or mixing the components while they are being combined. In some embodiments, the resulting light-curable composition, prior to any curing, is a liquid. In some embodiments, the non-cured liquid light-curable composition may have a dynamic viscosity of about 1 centipoise (cp) to about 1500 cp at 20° C., for example, as measured using the method described in international organization for standardization (ISO) 2884 or ISO 2555.

Figure 6B:
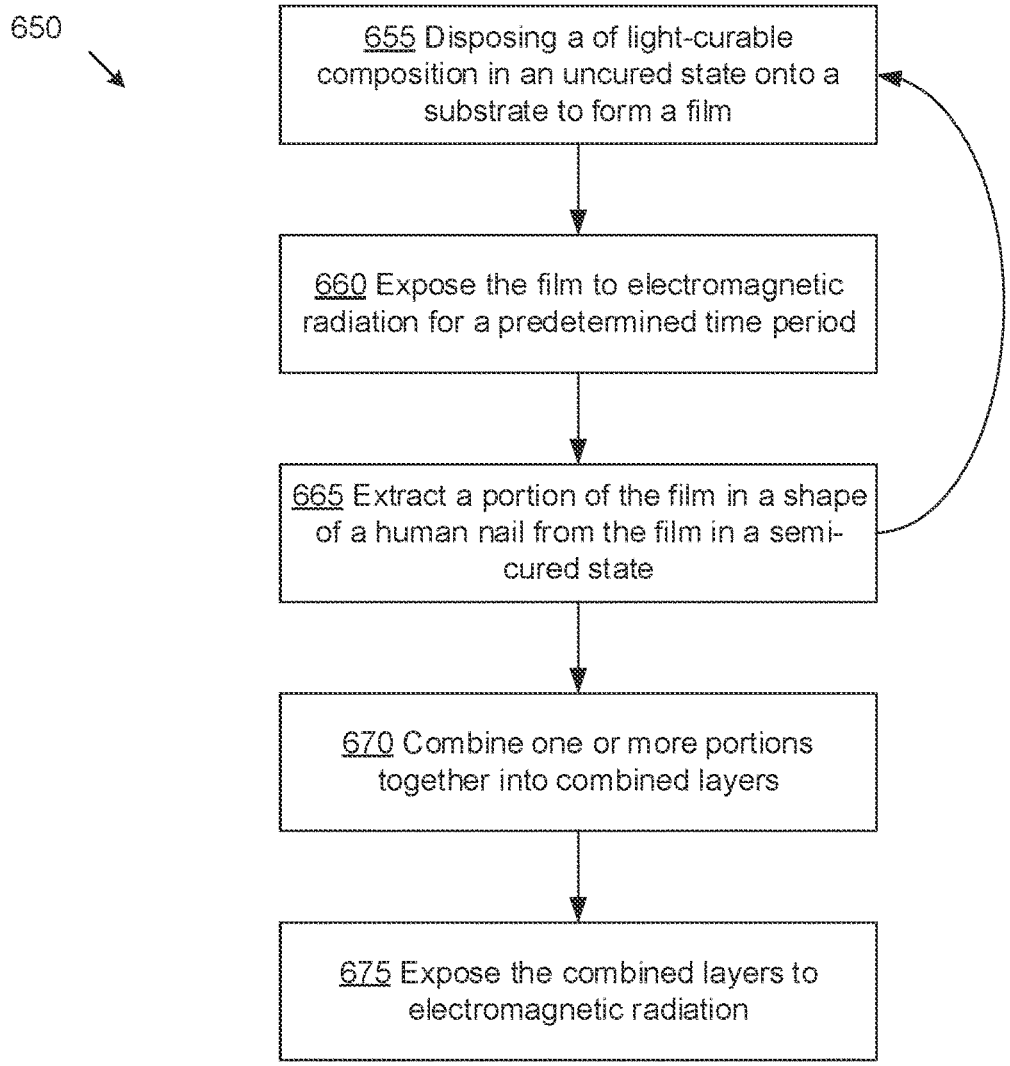
FIG. 6B illustrates a method of preparing light-curable artificial nails, in accordance with some embodiments.

FIG. 6B illustrates a method of preparing light-curable artificial nails, in accordance with some embodiments. It should be noted that in some embodiments elements or operations of method 600 can be combined with elements or operations of method 650 of FIG. 6B, and vice versa. It can be noted that operations 655 through 665 can be repeated (represented by the arrow from operation 665 to operation 655) using the same light-curable composition or different light-curable composition to form various layers or sections, as described herein.

At operation 655 of method 650, equipment disposes a light-curable composition in an uncured state onto a substrate to form a film. For example, an uncured light-curable composition can be disposed onto a planar substrate to form a thin layer or sheet of uncured light-curable composition.

In some embodiments, the equipment can dispose a light-curable composition of adhesive in an uncured state onto a first substrate to form the adhesive film. In some embodiments, the equipment disposes a light-curable composition of polish in an uncured state on a second substrate to form a polish film. In some embodiments, the equipment disposes a light-curable composition of top coat in an uncured state onto a third substrate to form the top coat film. In some embodiments, one or more of the above light-curable compositions can be different from one another.

At operation 660, the equipment exposes the film to electromagnetic radiation for a predetermined time period.

In some embodiments, the equipment can expose the adhesive film to second electromagnetic radiation for a second predetermined time period to transition the adhesive film from the uncured state to the semi-cured state. In some embodiments, the equipment can expose the polish film to third electromagnetic radiation for a third predetermined time period to transition the polish film from the uncured state to the semi-cured state. In some embodiments, the equipment can expose the top coat film to fourth electromagnetic radiation for a fourth predetermined time period to transition the top coat film from the uncured state to the semi-cured state. In some embodiments, one or more of the predetermined time periods described above can be the same or different from one another.

In some embodiments, at least one of the polish film or the top coat film is formed from a non-light-curable composition. In some embodiments, if a particular layer or section does not include a light-curable composition, the particular layer or section can be disposed over the semi-cured film. For example, if the top coat section is not formed of a light-curable composition and the polish section is formed from a light-curable composition, the top coat composition can be disposed on the semi-cured polish film. If the polish section is not formed of light-curable composition, the polish composition can be disposed above (e.g., with a strengthening section disposed on the adhesive section) or on the adhesive film. If both the polish section and top coat section are not formed of a light-curable composition, the polish section composition can be disposed above or on the semi-cured adhesive section. The polish section composition can be allowed to dry and the top coat section can be disposed above the dry polish section.

In other embodiments, if a particular layer or section does not include a light-curable composition, the particular layer or section can be disposed onto a substrate to form a film and extracted from the film in a similar manner as described above with respect to operations 655 and 660.

At operation 665, the equipment extracts a portion of the film in a shape of a human nail from the film in the semi-cured state. In some embodiments, the portion of the film can be extracted using a stamp or otherwise be cut from the film.

In some embodiments, the equipment extracts from an adhesive film in a semi-cured state a portion of the adhesive film in a shape of the human nail. The portion of the adhesive film includes a light-curable composition configured in the semi-cured state. In some embodiments, the equipment extracts from a polish film a portion of the polish film in the shape of the human nail. In some embodiments, the equipment extracts from a top coat film a portion of the top coat film in the shape of the human nail.

In some embodiments, the equipment disposing one or more decorations above the polish film. In some embodiments, the strengthening material is obtained. In some embodiments, the strengthening material includes a fabric material. In some embodiments, the fabric material includes one or more of fiberglass, silk, or linen.

At operation 670, the equipment combines one or more portions into combined layers (or sections). In some embodiments, the portions can include semi-cured light-curable composition(s) that can be tacky and stick such that the portions (e.g., layers or sections) can be combined with an application of pressure. In some embodiments, an adhesive or other material can be used to combine various potions (or other materials, layers or sections). In some embodiments, the portion of the adhesive film, the portion of the polish film, and the strengthening material are combined into layers of the light-curable artificial nail. In some embodiments, the portion of polish film is disposed above the strengthening material. In some embodiments, the equipment combines the portion of the top coat film with the layers of the light-curable artificial nail to form the combined layers of the light-curable artificial nail.

At operation 675, the combined layers are exposed to electromagnetic radiation. In some embodiments, the equipment exposes the combined layers to first electromagnetic radiation for a first predetermined time period to bond respective adjacent layers of the combined layers together. In some embodiments, exposing the combined layers to the first electromagnetic radiation for the first predetermined time period transitions one or more of the combined layers from a first semi-cured state to a second semi-cured state. In the second semi-cured state, one or more of the light-curable compositions of the combined layers are more cured than in the first semi-cured state (but are not fully cured).

Methods of Using Light-Curable Artificial Nails

FIG. 7 illustrates a method using light-curable artificial nails, in accordance with some embodiments. Method 700 can be performed by a user, such as a nail technician or a user that applies the light-curable artificial nails to their own natural nails.

Method 700 can include operation 705 that removes the light-curable artificial nail in semi-cured state from a removable layer. In some embodiments, the light-curable artificial nail can have an adhesive section that is disposed on at least part of the bottom surface of the light-curable artificial nail.

Operation 710 includes arranging the light-curable artificial nail in the semi-cured state onto a natural nail. As noted herein, the light-curable artificial nail in the semi-cured state is elastic and/or bendable to facilitate conformance of the light-curable nail to the shape of the natural nail. Arranging the light-curable artificial nail onto the natural nail may include one or more of orientating, stretching, pushing, pulling, moving, lengthening or otherwise shaping the light-curable artificial nail to (e.g., completely) cover the natural nail and to form a desired shape.

For example, the user can arrange a side of (the semi-cured) light-curable artificial nail to align proximate to (e.g., approximately flush with) one of the lateral nail folds that runs adjacent to the natural nail and adhere the light-curable artificial nail to part of the natural nail. The user can then bend and/or stretch the light-curable artificial nail so that it covers the entirety of the natural nail and that so that the opposite side of the light-curable artificial nail aligns proximate to the opposite lateral nail fold of the natural nail. As such, a particular light-curable artificial nail can conform to different shapes and/or angles of different natural nails.

Once a user is satisfied with the shape of the semi-cured light-curable artificial nail as arranged onto the nail, the method 700 at operation 715 includes curing the semi-cured light-curable composition using one or more predetermined wavelengths of electromagnetic radiation. The light-curable composition(s) can transform from the semi-cured state to a cured state resulting in a cured light-curable artificial nail.

In some embodiments, the light-curable artificial nail can include be applied by employing pressure to the top of the artificial nail so that the light-curable artificial nail bonds, via the adhesive, to the natural nail. In some embodiments, the pressure can be applied concurrent with the curing. In some embodiments, the pressure can be applied by a pressure member (and/or stencil) of the light emitting device.

According to some embodiments, the curing includes inserting a finger (or toe) having the semi-cured light-curable artificial nail attached thereto into a light emitting device and activating the light source of the light emitting device to emit one or more wavelengths of electromagnetic radiation. In some embodiments, the method may further include inserting a stencil into the light emitting device. In some embodiments, a stencil can be overlaid on the semi-cured light-curable composition and subsequently inserting the finger into the light emitting device. In some embodiments, the stencil and/or pressure member can apply pressure to the light-curable artificial nail to help facility the bond between the light-curable artificial nail and the natural nail. In some embodiments, upon curing the light-curable artificial nail to a cured state, only the portions of the semi-cured light-curable composition that are exposed to electromagnetic radiation will cure. Any semi-cured portions of the body that remain can be filed, trimmed or otherwise removed leaving behind the cured portions. According to some embodiments, the semi-cured body are transformed to the cured state in one curing cycle of a light emitting device.

Methods of using light-curable artificial nails as described herein may further include cleaning the natural nail before arranging the light-curable artificial nail onto the natural nail. In some embodiments, the cleaning includes applying a cleaning solvent to the natural nail.

According to embodiments, the light-curable artificial nail in a cured state may have Rockwell hardness of about 1 g/cc to about 110 g/cc, or about 5 g/cc to about 90 g/cc, or about 10 g/cc to about 80 g/cc, or about 20 g/cc to about 50 g/cc, and/or a Shore D hardness of about 10 to about 100, or about 30 to about 80. In some embodiments, the cured light-curable artificial nail includes a colorant and/or may be over coated with a light-curable composition containing the colorant that is subsequently cured to a cured state. In some embodiments, the light-curable artificial nail in the cured state is free of any one or more of a pre-formed hard plastic, a primer, a basecoat, a nail polish, an acrylate polymer or copolymer, a methacrylate, an ethyl methacrylate, a butyl methacrylate, a cyanoacrylate, a urethane(meth) acrylate, a polymethyl methacrylate, a polymethyl methacrylate-polymethacrylic acid copolymer, a polypropylene glycol (meth) acrylated monomer, or a polyethylene glycol (meth) acrylated monomer.

Described herein are various embodiments of artificial nails, methods of preparation and methods of use thereof. It is to be understood that the aspects of the disclosure are not limited to the details of construction or process steps set forth in the following description. Aspects of the disclosure can be used to describe other embodiments and of being practiced or being carried out in a variety of ways.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

As used herein, the singular forms "a," "an," and "the" include plural references unless the context clearly indicates otherwise. Thus, for example, reference to "an active ingredient" includes a single active ingredient as well as a mixture of two or more different active ingredients. The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances.

As used herein, the term "about" in connection with a measured quantity, refers to the normal variations in that measured quantity as expected by one of ordinary skill in the art in making the measurement and exercising a level of care commensurate with the objective of measurement and the precision of the measuring equipment. In certain embodiments, the term "about" includes the recited number ±10%, such that "about 10" would include from 9 to 11.

The term "at least about" in connection with a measured quantity refers to the normal variations in the measured quantity, as expected by one of ordinary skill in the art in making the measurement and exercising a level of care commensurate with the objective of measurement and precisions of the measuring equipment and any quantities higher than that. In certain embodiments, the term "at least about" includes the recited number minus 10% and any quantity that is higher such that "at least about 10" would include 9 and anything greater than 9. This term can also be expressed as "about 10 or more." Similarly, the term "less than about" typically includes the recited number plus 10% and any quantity that is lower such that "less than about 10" would include 11 and anything less than 11. This term can also be expressed as "about 10 or less."

Unless otherwise indicated, all parts and percentages are by weight. Weight percent (wt. %), if not otherwise indicated, is based on an entire composition free of any volatiles, that is, based on dry solids content.

Spatially relative terms, such as "above," "upper," "lower," "top," "bottom," and so forth as used herein refer to a relative position of one element with respect to another element. Unless otherwise specified, the spatially relative terms are not intended to be limiting to the absolute orientation, and are intended to encompass different orientations (e.g., rotated 90 degrees, flipped, etc.) of elements in addition to the orientation depicted in the Figures. For example, if elements in the Figures are rotated 180 degrees, elements described as "upper" elements can then be considered oriented as "lower" elements, without deviating from aspects of the disclosure.

The terms "over," "above" "under," "between," and "on" as used herein refer to a relative position of one section, material layer or element with respect to other sections, layers or elements. For example, one section disposed above or over or under another section may be directly in contact with the other section or may have one or more intervening sections. Moreover, one section disposed between two other sections may be directly in contact with the two other sections or may have one or more intervening sections. In contrast, a first section "on" a second section is in direct contact with that second section. Similarly, unless explicitly stated otherwise, one element disposed between two other elements may be in direct contact with the adjacent elements or may have one or more intervening sections, layers or elements.

Although the disclosure herein is with reference to particular embodiments, it is to be understood that these embodiments are merely illustrative of the principles and applications of the invention. It will be apparent to those skilled in the art that various modifications and variations can be made to the compositions and methods without departing from the spirit and scope of the invention. Thus, it is intended that the invention include modifications and variations that are within the scope of the appended claims and their equivalents.

I claim:

1. A light-curable artificial nail, comprising:
   an adhesive section comprising a light-curable composition in a semi-cured state, wherein the light-curable composition is configured to transition from the semi-cured state to a cured state based on exposure to at least one wavelength of electromagnetic radiation;
   a strengthening section disposed above the adhesive section; and
   a polish section disposed above the adhesive section.

2. The light-curable artificial nail of claim 1, wherein the light-curable composition of the adhesive section is a first light-curable composition, wherein the polish section comprises a second light-curable composition in the semi-cured state.

3. The light-curable artificial nail of claim 2, wherein the first light-curable composition is different than the second light-curable composition.

4. The light-curable artificial nail of claim 1, wherein the adhesive section is designed to secure the light-curable artificial nail to a natural nail with an application of pressure and the at least one wavelength of electromagnetic radiation.

5. The light-curable artificial nail of claim 1, further comprising:
   a decorative section disposed above the polish section, the decorative section comprising one or more decorations.

6. The light-curable artificial nail of claim 1, further comprising:
   a top coat section disposed above the polish section.

7. The light-curable artificial nail of claim 6, wherein the light-curable composition of the adhesive section is a first light-curable composition, wherein the top coat section comprises a third light-curable composition in the semi-cured state, and wherein the first light-curable composition is different than the third light-curable composition.

8. The light-curable artificial nail of claim 6, wherein the top coat section is transparent.

9. The light-curable artificial nail of claim 1, wherein the strengthening section comprises a fabric material comprising at least one of fiberglass, silk, or linen.

10. The light-curable artificial nail of claim 1, wherein the polish section comprises a colorant.

11. The light-curable artificial nail of claim 1, wherein the light-curable composition comprises at least one component that is curable by ultraviolet (UV) light radiation, visible light radiation, or a combination thereof.

12. The light-curable artificial nail of claim 1, wherein the light-curable composition comprises at least one of a polymer, a film forming agent, a plasticizer, an additive, a dispersant, a photoinitiator, silicone, silicon, keratin, an ethylenically unsaturated monomer, an oligomer, an unreactive solvent or a colorant.

13. The light-curable artificial nail of claim 12, wherein the polymer comprises at least one of a polyurethane, a (meth)acrylic polymer, poly(methyl methacrylate), a vinyl polymer, a vinyl copolymer, a cellulose polymer or a styrene butadiene polymer.

14. The light-curable artificial nail of claim 12, wherein the film forming agent comprises at least one of an epoxy resin, a (meth)acrylic resin, a styrene resin, an acrylate-styrene resin, a vinyl resin, a polyester, an alkyd resin, a cellulose ester or a resin resulting from condensation of formaldehyde with an arylsulphonamide.

15. The light-curable artificial nail of claim 12, wherein the plasticizer comprises at least one of tributyl phosphate, tributoxyethyl phosphate, tricresyl phosphate, triphenyl phosphate, glycerol triacetate, butyl stearate, butyl glycolate, benzyl benzoate, butyl acetyltricinoleate, glyceryl acetyltricinoleate, dibutyl phthalate, diisobutyl phthalate, dioctyl phthalate, dimethoxyethyl phthalate, diamyl phthalate, triethyl citrate, tributyl citrate, tributyl acetylcitrate, tri(2-ethylhexyl)acetylcitrate, dibutyl tartrate or camphor.

16. The light-curable artificial nail of claim 12, wherein the additive comprises at least one of silica, fumed silica, diatomaceous earth, bentonite clay, kaolinite, pyrophyllite, sericite, a smectic, a vermiculite, montmorillinite, beidillite, nontronite, hectorite, talc, mica, zirconium oxide, zinc oxide, magnesium oxide, saponite, calcium stearate, zinc stearate, aluminum stearate, stearalkonium, distearalkonium, an organic modified clay, a hydrogenated castor oil, a hydrogenated castor oil wax, an inorganically modified castor oil, an organically modified castor oil, a triglyceride, glyceryl tri-12-hydroxy stearate, a polyamide, a polyamide wax, 12-hydroxystearic acid diamide of ethylene diamine, 12-hydroxystearic acid diglycolamide, N-stearyl ricinoleamide, N-stearyl stearamide, a polyethylene oxide wax, a urea urethane, an acrylic resin, an amine salt of a polymeric polyester, salts of linear polyaminoamide salts of polymeric polyester, an amide solution of polycarboxylic acid, alkyl sultanate, alkylallyl sultanate, colloidal ester, polyester resin, phenol resin, melamine resin, epoxy resin, urethane resin, a polyimide resin or a polyester amide.

17. The light-curable artificial nail of claim 12, wherein the dispersant comprises at least one of a non-surface active polymer, a surface-active component added to a gel or a surfactant.

18. The light-curable artificial nail of claim 1, wherein the light-curable composition comprises about 1 weight percentage (wt %) to about 50 wt % of a resin, about 1 wt % to about 50 wt % of a photoinitiator and about 1 wt % to about 90 wt % of a polymer.

19. The light-curable artificial nail of claim 1, wherein in the semi-cured state, the light-curable composition comprises a modulus of elasticity of about $100 \times 10^{-6}$ gigapascals (GPa) to about 2.50 GPa, and in the cured state the light-curable composition comprises a Rockwell hardness of about 1 gram per cubic centimeter (g/cc) to about 110 g/cc.

20. The light-curable artificial nail of claim 1, wherein the light-curable artificial nail is free of at least one of a pre-formed hard plastic or an acrylic polymer.

21. The light-curable artificial nail of claim 1, wherein the light-curable artificial nail is in a shape of a natural nail, wherein said shape is ovular, rectangular, pointed, or rounded.

22. The light-curable artificial nail of claim 1, wherein the polish section is disposed above the strengthening section.

* * * * *